(12) United States Patent
Volkerink et al.

(10) Patent No.: US 11,954,639 B2
(45) Date of Patent: Apr. 9, 2024

(54) METHOD FOR DETECTING AND TRACKING GROUPS OF ASSETS AND SYSTEM THEREOF

(71) Applicant: Trackonomy Systems, Inc., San Jose, CA (US)

(72) Inventors: Hendrik J Volkerink, Palo Alto, CA (US); Ajay Khoche, West San Jose, CA (US)

(*) Notice: Subject to any disclaimer, the term of this patent is extended or adjusted under 35 U.S.C. 154(b) by 0 days.

(21) Appl. No.: 17/592,497

(22) Filed: Feb. 3, 2022

(65) Prior Publication Data

US 2022/0300892 A1 Sep. 22, 2022

Related U.S. Application Data

(63) Continuation-in-part of application No. 17/648,917, filed on Jan. 25, 2022.

(60) Provisional application No. 63/291,467, filed on Dec. 20, 2021, provisional application No. 63/215,379, filed on Jun. 25, 2021, provisional application No. 63/145,103, filed on Feb. 3, 2021, provisional application No. 63/141,149, filed on Jan. 25, 2021.

(51) Int. Cl.
| G06Q 10/08 | (2023.01) |
| G06K 19/077 | (2006.01) |
| G06Q 10/0833 | (2023.01) |
| G06Q 10/087 | (2023.01) |

(52) U.S. Cl.
CPC ....... G06Q 10/087 (2013.01); G06K 19/0776 (2013.01); G06Q 10/0833 (2013.01)

(58) Field of Classification Search
CPC .................. G06Q 10/087; G06Q 10/0833
See application file for complete search history.

(56) References Cited

U.S. PATENT DOCUMENTS

| 5,917,433 A | 6/1999 | Keillor et al. |
| 6,437,702 B1 | 8/2002 | Ragland |
| 6,522,874 B1 | 2/2003 | Chu et al. |

(Continued)

FOREIGN PATENT DOCUMENTS

| AU | 2018204317 A1 | 1/2019 |
| AU | 2018250358 A1 | 5/2019 |

(Continued)

OTHER PUBLICATIONS

International Patent Application No. PCT/US2022/47338 International Search Report and Written Opinion dated Apr. 7, 2023, 15 pages.

(Continued)

*Primary Examiner* — Hongmin Fan

(57) ABSTRACT

A method for detecting the usage of assets includes attaching a tracking device to each asset of a plurality of assets. An identifier associated with the asset is stored on a memory of the tracking device. After an asset has been used or is empty, the asset is physically grouped with other used or empty assets. Using the tracking devices, it is detected that an asset that the tracking device is attached to has been grouped with other assets. The tracking devices associated with the group of assets determine a manifest of asset identifiers for each asset in the group of used or empty assets. An asset tracking system determines that each asset corresponding to the identifiers in the manifest is used or empty.

20 Claims, 24 Drawing Sheets

(56) References Cited

U.S. PATENT DOCUMENTS

| | | |
|---|---|---|
| 6,919,803 B2 | 7/2005 | Breed |
| 7,009,517 B2 | 3/2006 | Wood |
| 8,095,070 B2 | 1/2012 | Twitchell, Jr. |
| 8,542,099 B2 * | 9/2013 | Pizzuto .................. H04Q 9/00 235/462.07 |
| 9,228,911 B1 | 1/2016 | Meyers |
| 10,758,943 B1 | 9/2020 | Carpenter |
| 11,115,732 B2 | 9/2021 | Lucrecio et al. |
| 2002/0089434 A1 | 7/2002 | Ghazarian |
| 2003/0089771 A1 | 5/2003 | Cybulski et al. |
| 2004/0066274 A1 | 4/2004 | Bailey |
| 2004/0224640 A1 | 11/2004 | MacFarland |
| 2006/0055552 A1 | 3/2006 | Chung et al. |
| 2006/0187033 A1 | 8/2006 | Hall et al. |
| 2007/0085677 A1 | 4/2007 | Neff et al. |
| 2007/0095905 A1 | 5/2007 | Kadaba |
| 2007/0164858 A1 | 7/2007 | Webb |
| 2007/0164863 A1 | 7/2007 | Himberger et al. |
| 2009/0322510 A1 | 12/2009 | Beger et al. |
| 2011/0127325 A1 | 6/2011 | Hussey et al. |
| 2012/0075343 A1 | 3/2012 | Chen et al. |
| 2013/0002443 A1 | 1/2013 | Breed et al. |
| 2013/0211976 A1 | 8/2013 | Breed |
| 2014/0062699 A1 | 3/2014 | Heine et al. |
| 2015/0227245 A1 | 8/2015 | Inagaki et al. |
| 2015/0312653 A1 | 10/2015 | Avrahami et al. |
| 2015/0366518 A1 | 12/2015 | Sampson |
| 2017/0078950 A1 | 3/2017 | Hillary et al. |
| 2018/0012472 A1 | 1/2018 | Purcell |
| 2018/0165568 A1 | 6/2018 | Khoche |
| 2018/0374039 A1 | 12/2018 | Walden et al. |
| 2019/0012936 A1 | 1/2019 | Yazdi et al. |
| 2019/0037362 A1 | 1/2019 | Nogueira-Nine |
| 2019/0370624 A1 | 12/2019 | Khoche |
| 2020/0104790 A1 | 4/2020 | Chung |
| 2020/0223066 A1 | 7/2020 | Diankov et al. |
| 2020/0285726 A1 | 9/2020 | Kalous |
| 2020/0405223 A1 | 12/2020 | Mai et al. |

FOREIGN PATENT DOCUMENTS

| | | | | |
|---|---|---|---|---|
| CA | 3061878 A1 | | 11/2018 | |
| CA | 3008512 A1 | | 12/2018 | |
| DE | 6000642 | * | 7/2000 | ............. B07C 3/008 |
| EP | 0007248 | * | 7/1979 | ............. B07C 5/126 |
| WO | WO 2014153418 A1 | | 9/2014 | |
| WO | WO 2018053309 A1 | | 3/2018 | |
| WO | WO 2021/086248 A1 | | 5/2021 | |

OTHER PUBLICATIONS

International Patent Application No. PCT/US2022/013729 International Search Report and Written Opinion dated Jun. 6, 2022, 11 pages.

International Patent Application No. PCT/US2022/015161 International Search Report and Written Opinion dated Jul. 1, 2022, 15 pages.

U.S. Appl. No. 16/776,804, Final Office Action dated Feb. 3, 2022, 20 pages.

International Patent Application No. PCT/US2021/053028 International Search Report and Written Opinion dated Jan. 12, 2022, 11 pages.

International Patent Application No. PCT/US2021/034112, International Search Report and Written Opinion dated Oct. 22, 2021, 14 pages.

Nisarga et al. "System-Level Tamper Protection Using MSP MCUs." Texas Instruments, Aug. 2016, 13 pages.

Sanchez et al. Machine Learning on Difference Image Analysis: A comparison of Methods for Transient Detection.

PCT Application No. PCT/US2020/014521 International Preliminary Report on Patentability, dated Jul. 27, 2021, 6 pages.

U.S. Appl. No. 16/776,804, Non-Final Office Action dated Jul. 15, 2021, 9 pages.

U.S. Appl. No. 16/517,508, Non-Final Office Action dated Jan. 7, 2021, 10 pages.

U.S. Appl. No. 16/517,508, Non-Final Office Action dated May 6, 2020, 35 pages.

* cited by examiner

1901

Attach tracking device to assets, each tracking device storing an asset identifier corresponding to the asset is attached to
1910

Gather assets that are finished being used into a grouping, each asset in a group being within a threshold distance from another asset in the group
1920

Tracking devices on each grouped asset communicate with each other
1930

Identify a tracking device associated with an asset in the group of assets as a master tracking device
1940

Master tracking device determines a manifest of the asset identifiers for each asset in the grouping of assets
1950

Communicate manifest of the asset identifiers to the asset tracking system using the master tracking device
1960

Store the number of assets that have been used in a database of the asset tracking system and (optionally) display the information from the database on a user's client device
1970

```
Detect two or more assets as being grouped (e.g., stacked) based on data from one or more
tracking devices associated with at least one of the assets
2110
```

```
Determine an order of the grouped assets, the order representing relative positions of the
assets in the group
2120
```

```
Determine battery life for each tracking device associated with each of the grouped assets
2130
```

```
Identify one of the assets as a master node based on the order of the assets and the battery
life of each of the one or more tracking devices
2140
```

```
Determine a manifest of the grouped assets, the manifest including an identifier for each
asset and a current number of assets in the group
2150
```

```
Communicate the manifest for the group of assets to the asset tracking system using a
tracking device associated with the master node
2160
```

```
Store the number of grouped assets in a database of the asset tracking system and
(optionally) display the information from the database on a user's client device
2170
```

FIG. 21

METHOD FOR DETECTING AND TRACKING GROUPS OF ASSETS AND SYSTEM THEREOF

CROSS-REFERENCE TO RELATED APPLICATIONS

This application is a continuation-in-part of U.S. Non-provisional patent application Ser. No. 17/648,917, filed on Jan. 25, 2022, which claims priority to U.S. Provisional Patent Application No. 63/141,149, filed on Jan. 25, 2021, to U.S. Provisional Patent Application No. 63/215,379, filed on Jun. 25, 2021, and to U.S. Provisional Patent Application No. 63/291,467, filed on Dec. 20, 2021, all of which are incorporated herein in their entirety. This application also claims priority to U.S. Provisional Patent Application No. 63/145,103, filed on Feb. 3, 2021, which is incorporated herein in its entirety.

FIELD OF THE DISCLOSURE

This disclosure generally relates to wireless internet of things (IOT) devices and, in particular, to asset tracking.

BACKGROUND

In supply chain management, accurate tracking of inventory and communication of inventory needs is critical. When large quantities of inventory are moved or used up, it may be difficult to keep track of the changes. Especially in situations where there are multiple agents who are each independently tracking changes in inventory, errors in counting, tracking, and managing inventory may arise.

SUMMARY

In the present disclosure, an asset tracking system includes assets that are tracked by retrofitting the assets with a tracking device. In some embodiments, the tracking device is an adhesive tape platform, a smart label, or a tracking device with a thin, rigid label form factor. In a further embodiment, the asset is a reusable supply or storage asset (e.g., a pallet). In an embodiment, the tracking device includes a weight sensor integrated into the tracking device, and the tracking device can determine the weight of items stored on the asset. The tracking device can wirelessly communicate with the asset tracking system to provide updates on the weight of the items stored on the asset. The asset tracking system notifies users of the current inventory of items based on the measured weights of the items stored on the assets.

In another embodiment, after an asset is used or is empty, the asset is grouped in an arrangement. For example, the assets may be vertically stacked when empty. The tracking devices on the assets detect the arrangement and determine a manifest of asset identifiers for each asset in the arrangement. One or more of the tracking devices may communicate the manifest to the asset tracking system to update the asset tracking system on which assets have been used or are empty. The asset tracking system may determine the quantity and type of inventory that has been used or unloaded from the asset, based on the updates, according to some embodiments.

A method for detecting the usage of assets includes attaching a tracking device to each asset of a plurality of assets, each tracking device configured to wirelessly communicate with other nodes of an asset tracking system including other tracking devices. An identifier associated with the asset is stored on a memory of the tracking device. For example, the identifier may be an identifier printed on the asset, such as a barcode or serial number. After an asset has been used or is empty, the asset is physically grouped with other used or empty assets. Using the tracking devices, it is detected that an asset that the tracking device is attached to has been grouped with other assets. The tracking devices associated with the group of assets determine a manifest of asset identifiers for each asset in the group of used or empty assets. At least one tracking device attached to an asset in the group of used or empty assets transmits the manifest to the asset tracking system by at least one tracking device attached to an asset in the group of used or empty assets. The asset tracking system determines that each asset corresponding to the identifiers in the manifest is used or empty.

A method for determining an amount of used or moved inventory includes, attaching a tracking device to a container asset, the tracking device comprising a wireless communication system and a weight sensor configured to measure the weight of objects stored on the container asset. The tracking device determines the weight of objects stored on the container asset, based on measurements made by the weight sensor on the tracking device. In response to a change in the weight of objects stored on the container asset, the tracking device transmits an update to an asset tracking system that describes the change in weight. The asset tracking system determines an amount of inventory used or moved from the container asset, based on the transmitted update.

According to some embodiments, a tracking system for inventory management includes a plurality of tracking devices, each tracking device attached to a container asset, associated with the container asset, and configured to wirelessly communicate with wireless nodes of the tracking system including other tracking devices. The system includes a server that executes a tracking application configured to track the location of each container asset, based on wireless communications between the tracking devices and other wireless nodes of the tracking system. Each of the plurality of tracking devices is configured to detect when a respective associated container asset is grouped with one or more other container assets based on wireless communications between the tracking devices in a group.

BRIEF DESCRIPTION OF THE DRAWINGS

FIG. 19 is a flow chart for a method of detecting assets that are grouped in proximity to each in an arrangement, in accordance with some embodiments.

FIG. 21 is a flow chart for a method of detecting assets that are grouped together in a special arrangement, in accordance with some embodiments.

DETAILED DESCRIPTION

Figure 1A:
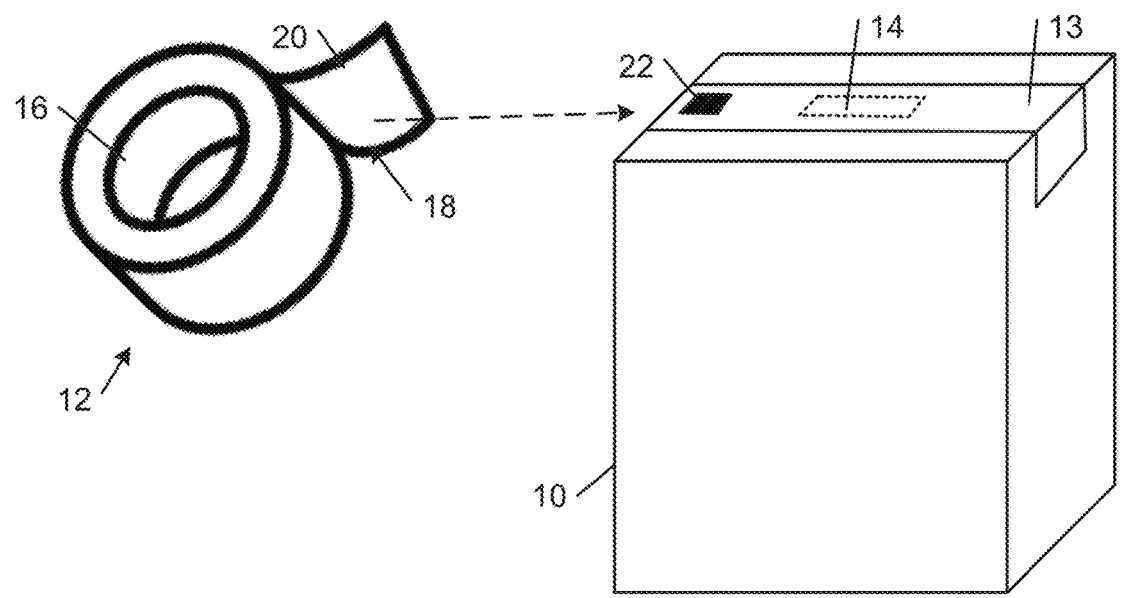
FIG. 1A is a diagrammatic view of an asset that has been sealed for shipment using a segment of an example adhesive tape platform dispensed from a roll, according to some embodiments.

Because of lead time (manufacturing time, travel time, etc.), it is difficult to detect quickly and accurately when items are sold in-stores or transferred from storage/shipment centers so as to ensure that the flow of supplies and/or inventory in a supply chain is accurately maintained. While this may currently be done by having users manually count/tally up assets, this often leads to incorrect assessments of current inventory, due to, for example, double counting of assets (e.g., the "bullwhip effect"). Method and system for accurately tracking inventory and use of assets is desired.

In the present disclosure, container assets or other assets are retrofitted with tracking devices capable of detecting when an associated product or item is sold or removed from the container asset or other asset. In some embodiments, tracking devices include weight sensors that detect the weight of objects stored on the container asset. In other embodiments, when an asset is empty or has been used, it is typically grouped with other empty of used assets in standard ways—for example, pallets are stacked, while other assets (kegs, tanks, etc.) may be gathered into a designated area when they are empty or after being used, in contrast to being dispersed when in use. In this case, the tracking device is configured to detect the grouping of the assets.

In some embodiments the tracking devices are attached to an exterior of the asset. In other embodiments the tracking devices are attached to an interior of the asset. For example, if the asset is a pallet, a portion of the tracking device may be positioned on the interior of the pallet to protect the portion of the tracking device from exposure to physical damage.

In some embodiments, the tracking device is a wireless IOT device. The wireless IOT device may be an adhesive tape platform or a segment thereof, in further embodiments. The adhesive tape platform includes wireless transducing components and circuitry that perform communication and/or sensing. The adhesive tape platform has a flexible adhesive tape form-factor that allows it to function as both an adhesive tape for adhering to and/or sealing objects and a wireless sensing device.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

As used herein, the term "or" refers to an inclusive "or" rather than an exclusive "or." In addition, the articles "a" and "an" as used in the specification and claims mean "one or more" unless specified otherwise or clear from the context to refer the singular form.

The term "tape node" refers to an adhesive tape platform or a segment thereof that is equipped with sensor, processor, memory, energy source/harvesting mechanism, and wireless communications functionality, where the adhesive tape platform (also referred to herein as an "adhesive product" or an "adhesive tape product") has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

The terms "adhesive tape node," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or wireless node, also referred to as an outer node, leaf node, or terminal node, refers to a node that does not have any child nodes.

In certain contexts, the terms "parcel," "envelope," "box," "package," "container," "pallet," "carton," "wrapping," and the like are used interchangeably herein to refer to a packaged item or items.

In certain contexts, the terms "wireless tracking system," "hierarchical communications network," "distributed agent operating system," and the like are used interchangeably herein to refer to a system or network of wireless nodes.

Introduction

This specification describes a low-cost, multi-function adhesive tape platform with a form factor that unobtrusively integrates the components useful for implementing a combination of different asset tracking and management functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various asset management and tracking applications and workflows, including person and object tracking applications, and asset management workflows such as manufacturing, storage, shipping, delivery, and other logistics associated with moving products and other physical objects, including logistics, sensing, tracking, locationing, warehousing, parking, safety, construction, event detection, road management and infrastructure, security, and healthcare. In some examples, the adhesive tape platforms are used in various aspects of asset management, including sealing assets, transporting assets, tracking assets, monitoring the conditions of assets, inventorying assets, and verifying asset security. In these examples, the assets typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications based network communications and transducing (e.g., sensing, actuating, etc.) applications. Examples of such applications include: event detection applications, monitoring applications, security applications, notification applications, and tracking applications, including inventory tracking, asset tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and locationing functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other asset tracking and management applications across heterogeneous environments.

Adhesive Tape Platform

FIG. 1A shows an example asset 10 that is sealed for shipment using an example adhesive tape platform 12 that includes embedded components of a wireless transducing circuit 14 (collectively referred to herein as a "tape node"). In this example, a length 13 of the adhesive tape platform 12 is dispensed from a roll 16 and affixed to the asset 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the asset 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
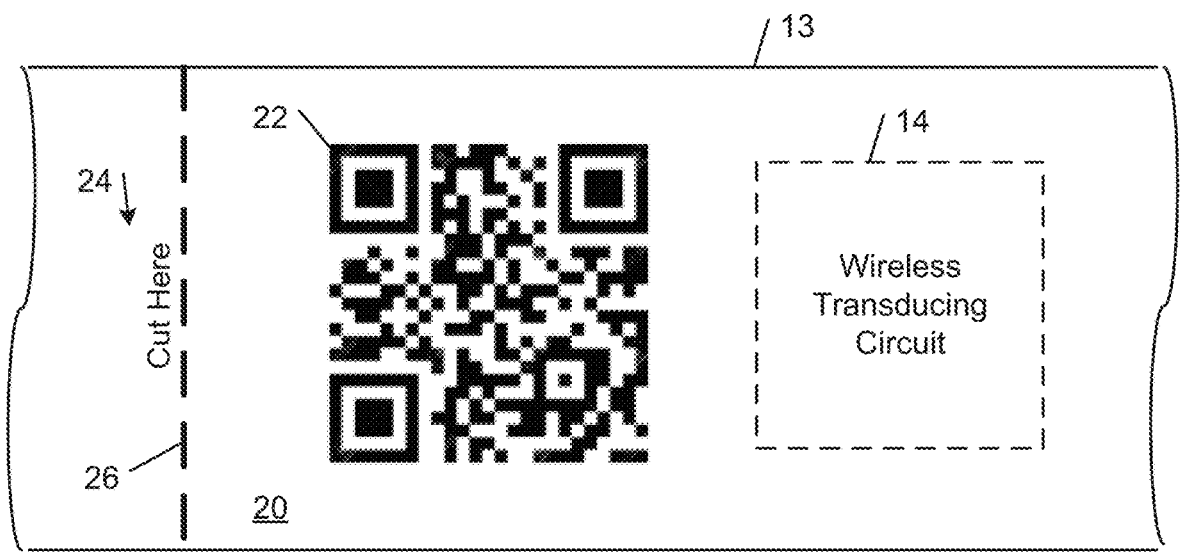
FIG. 1B is a diagrammatic top view of a portion of the segment of the example adhesive tape platform shown in FIG. 1A, according to some embodiments.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the asset 10 corresponds to a single segment of the adhesive tape platform 12. In other examples, the length of the adhesive tape platform 12 needed to seal a asset or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the asset 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time. In other examples, the energy sources are connected in parallel and alternately activated to power the transducing components 14 in respective ones of the adhesive tape platform segments 13 at different time periods, which may or may not overlap.

Figure 2:
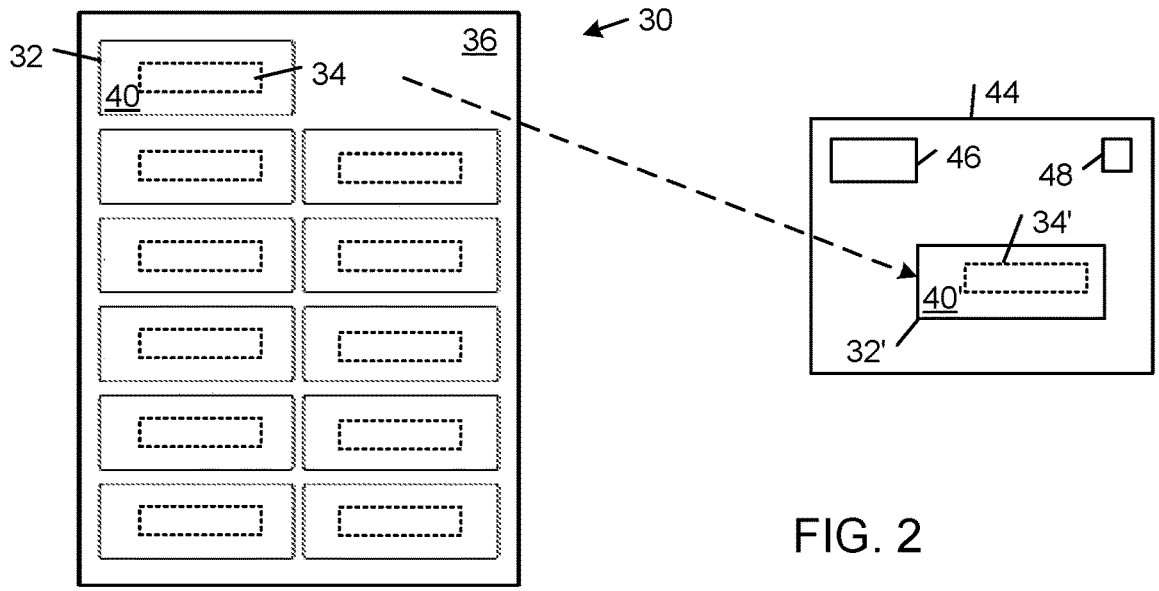
FIG. 2 is a diagrammatic view of an example of an envelope carrying a segment of an example adhesive tape platform dispensed from a backing sheet, according to some embodiments.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of a asset including the adhesive tape platform and any barcodes associated with the asset and, thereby, create a persistent record that links the adhesive tape platform 12 to the asset. In addition, the human operator typically will send the picture to a network service and/or transmit the picture to the adhesive tape platform 12 for storage in a memory component of the adhesive tape platform 12.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

Figure 3:
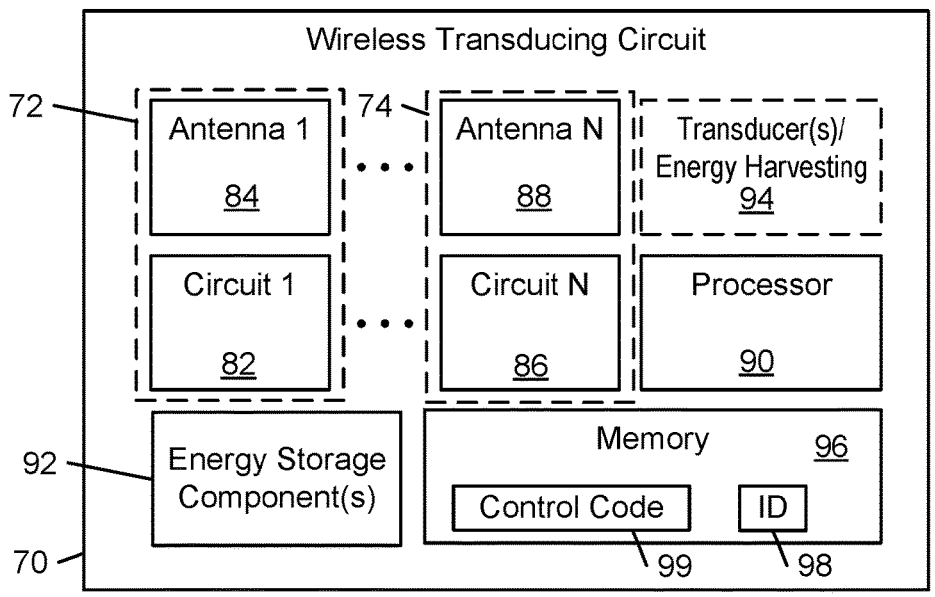
FIG. 3 is a schematic view of an example segment of an adhesive tape platform, according to some embodiments.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

Figure 4:
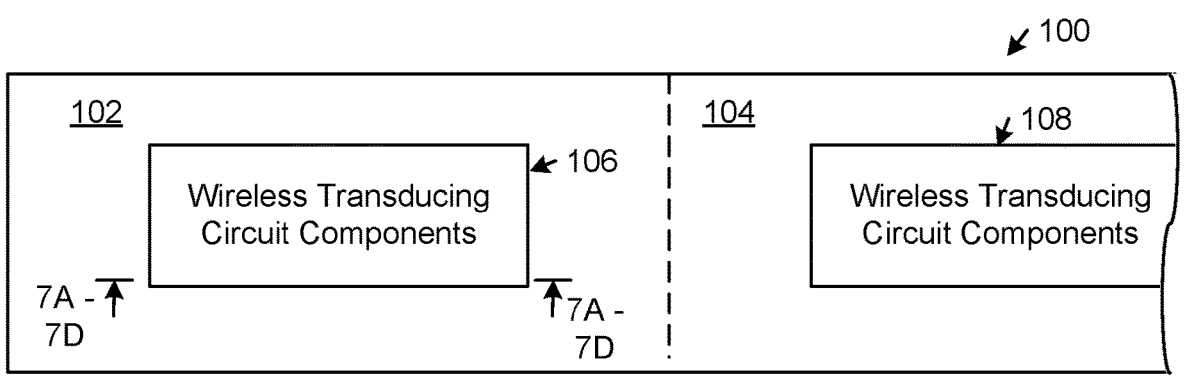
FIG. 4 is a diagrammatic top view of a length of an example adhesive tape platform, according to some embodiments.

FIG. 4 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. Pat. No. 10,262,255, issued Apr. 16, 2019, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
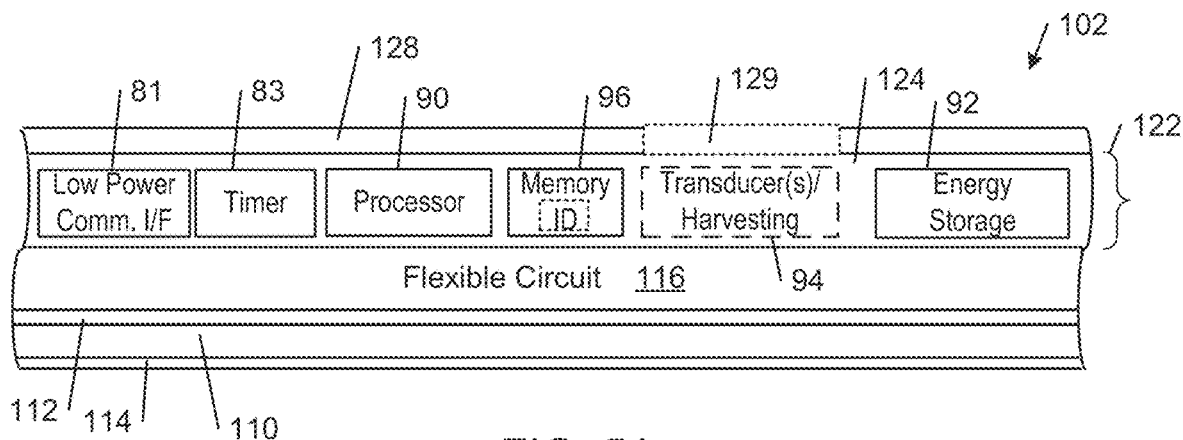
FIGS. 5A-5C show diagrammatic cross-sectional side views of portions of different respective adhesive tape platforms, according to some embodiments.

FIG. 5A shows a cross-sectional side view of a portion of an example segment 102 of the flexible adhesive tape platform 100 that includes a respective set of the components of the wireless transducing circuit 106 corresponding to the first tape node type (i.e., white). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Zigbee, Bluetooth® Low Energy (BLE) interface, or other low power communication interface), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communication interface 81 typically includes one or more of the antennas 84, 88 and one or more of the wireless circuits 82, 86.

Figure 5B:
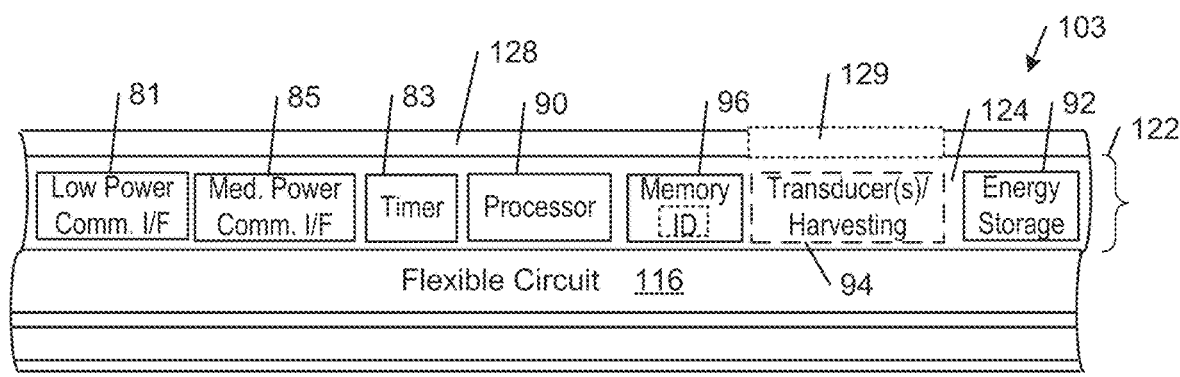

FIG. 5B shows a cross-sectional side view of a portion of an example segment 103 of the flexible adhesive tape platform 100 that includes a respective set of the components of the wireless transducing circuit 106 corresponding to the second tape node type (i.e., green). In this example, the flexible adhesive tape platform segment 103 differs from the segment 102 shown in FIG. 5A by the inclusion of a medium power communication interface 85 (e.g., a LoRa interface) in addition to the low power communications interface that is present in the first tape node type (i.e., white). The medium power communication interface has longer communication range than the low power communication interface. In some examples, one or more other components of the flexible adhesive tape platform segment 103 differ, for example, in functionality or capacity (e.g., larger energy source).

Figure 5C:
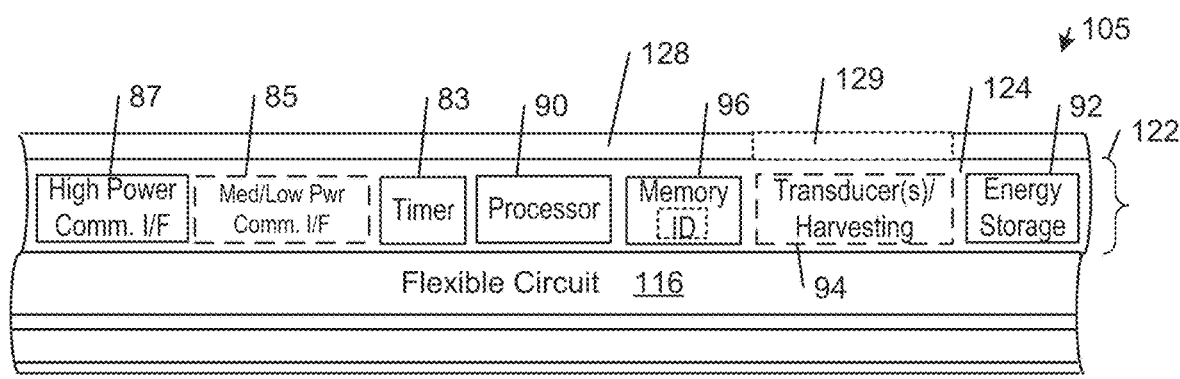

FIG. 5C shows a cross-sectional side view of a portion of an example segment 105 of the flexible adhesive tape platform 100 that includes a respective set of the components of the wireless transducing circuit 106 corresponding to the third tape node type (i.e., black). In this example, the flexible adhesive tape platform segment 105 includes a high power communications interface 87 (e.g., a cellular interface; e.g., GSM/GPRS) and an optional medium and/or low power communications interface 85. The high power communication range provides global coverage to available infrastructure (e.g. the cellular network). In some examples, one or more other components of the flexible adhesive tape platform segment 105 differ, for example, in functionality or capacity (e.g., larger energy source).

FIGS. 5A-5C show examples in which the cover layer 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the cover 128 that is positioned over the one or more transducers and/or energy harvesting components 94. Additional details regarding the structure and operation of example interfacial regions 129 are described in U.S. Provisional Patent Application No. 62/680,716, filed Jun. 5, 2018, PCT Patent Application No. PCT/US2018/064919, filed Dec. 11, 2018, U.S. Pat. No. 10,885,420, issued Jan. 4, 2021, U.S. Pat. No. 10,902,310 issued Jan. 25, 2021, and U.S. Provisional Patent Application No. 62/670,712, filed May 11, 2018, all of which are incorporated herein in their entirety.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces that may be applied to the flexible adhesive tape platform segment 102 during use. In the illustrated example, a flexible cover 128 is bonded to the planarizing polymer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the transducers) on the front-side of the flexible circuit 116 to the electrodes of the flexible battery 116 via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 are provided that include different respective sampling densities in order to seal different asset sizes with a desired number of wireless transducing circuits 70. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 70. In some example applications (e.g., shipping low value goods), only one wireless transducing circuit 70 is used per asset, whereas in other applications (e.g., shipping high value goods) multiple wireless transducing circuits 70 are used per asset. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

Figure 6A:
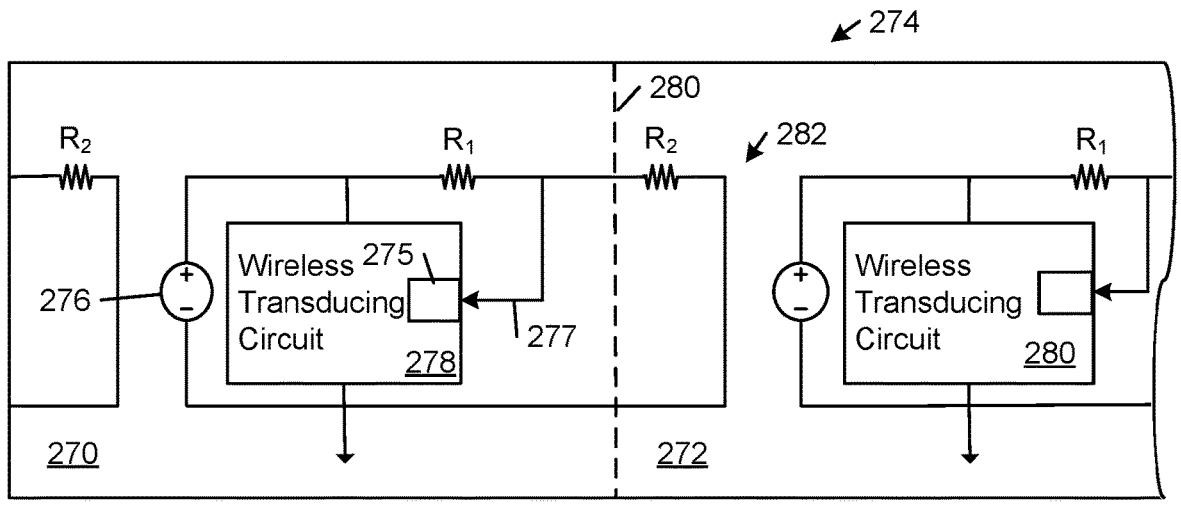
FIGS. 6A-6B are diagrammatic top views of a length of an example adhesive tape platform, according to some embodiments.

Referring to FIG. 6A, in some examples, each of one or more of the segments 270, 272 of a flexible adhesive tape platform 274 includes a respective one-time wake circuit 275 that delivers power from the respective energy source 276 to the respective wireless circuit 278 (e.g., a processor, one or more transducers, and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the adhesive tape platform 274, for example, by cutting across the adhesive tape platform 274 at a designated location (e.g., along a designated cut-line 280). In particular, in its initial, un-cut state, a minimal amount of current flows through the resistors R1 and R2. As a result, the voltage on the wake node 277 remains below the threshold turn-on level. After the user cuts across the adhesive tape platform 274 along the designated cut-line 280, the user creates an open circuit in the loop 282, which pulls the voltage of the wake node above the threshold level and turns on the wake circuit 275. As a result, the voltage across the energy source 276 will appear across the wireless circuit 278 and, thereby, turn on the segment 270. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of an adhesive tape platform includes a respective sensor and a respective wake circuit that delivers power from the respective energy source to the respective one or more of the respective wireless circuit components 278 in response to an output of the sensor. In some examples, the respective sensor is a strain sensor that produces a wake signal based on a change in strain in the respective segment. In some of these examples, the strain sensor is affixed to a adhesive tape platform and configured to detect the stretching of the tracking adhesive tape platform segment as the segment is being peeled off a roll or a sheet of the adhesive tape platform. In some examples, the respective sensor is a capacitive sensor that produces a wake signal based on a change in capacitance in the respective segment. In some of these examples, the capacitive sensor is affixed to an adhesive tape platform and configured to detect the separation of the tracking adhesive tape platform segment from a roll or a sheet of the adhesive tape platform. In some examples, the respective sensor is a flex sensor that produces a wake signal based on a change in curvature in the respective segment. In some of these examples, the flex sensor is affixed to a adhesive tape platform and configured to detect bending of the tracking adhesive tape platform segment as the segment is being peeled off a roll or a sheet of the adhesive tape platform. In some examples, the respective sensor is a near field communications sensor that produces a wake signal based on a change in inductance in the respective segment.

Figure 6B:
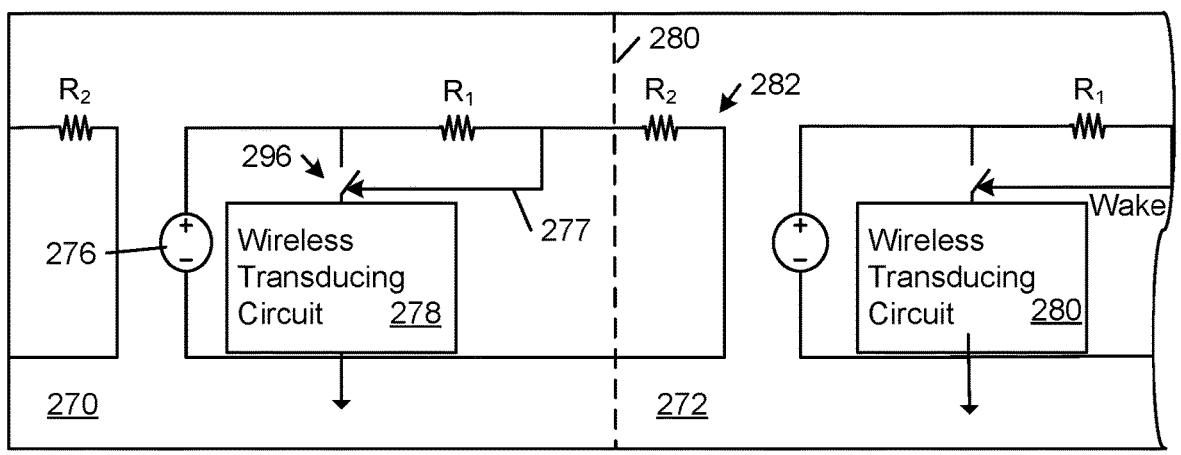

FIG. 6B shows another example of an adhesive tape platform 294 that delivers power from the respective energy source 276 to the respective tracking circuit 278 (e.g., a processor, one or more transducers, and one or more wireless communications circuits) in response to an event. This example is similar in structure and operation as the adhesive tape platform 294 shown in FIG. 6A, except that the wake circuit 275 is implemented by a switch 296 that is configured to transition from an open state to a closed state when the voltage on the switch node 277 exceeds a threshold level. In the initial state of the adhesive tape platform 294, the voltage on the switch node is below the threshold level as a result of the low current level flowing through the resistors R1 and R2. After the user cuts across the adhesive tape platform 294 along the designated cut-line 280, the user creates an open circuit in the loop 282, which pulls up the voltage on the switch node above the threshold level to close the switch 296 and turn on the wireless circuit 278.

Figure 6C:
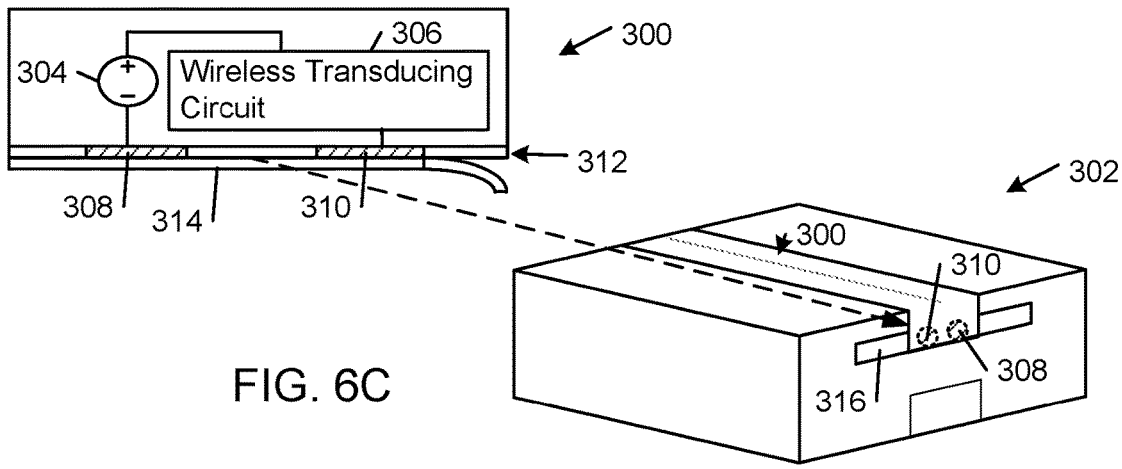
FIG. 6C is a diagrammatic view of a length of an example adhesive tape platform adhered to an asset, according to some embodiments.

FIG. 6C shows a diagrammatic cross-sectional front view of an example adhesive tape platform 300 and a perspective view of an example asset 302. Instead of activating the adhesive tape platform in response to separating a segment of the adhesive tape platform from a roll or a sheet of the adhesive tape platform, this example is configured to supply power from the energy source 302 to turn on the wireless transducing circuit 306 in response to establishing an electrical connection between two power terminals 308, 310 that are integrated into the adhesive tape platform. In particular, each segment of the adhesive tape platform 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the adhesive tape platform 300. In operation, the adhesive tape platform can be activated by removing the backing sheet 314 and applying the exposed adhesive layer 312 to a surface that includes an electrically conductive region 316. In the illustrated embodiment, the electrically conductive region 316 is disposed on a portion of the asset 302. When the adhesive backside of the adhesive tape platform 300 is adhered to the asset with the exposed terminals 308, 310 aligned and in contact with the electrically conductive region 316 on the asset 302, an electrical connection is created through the electrically conductive region 316 between the exposed terminals 308, 310 that completes the circuit and turns on the wireless transducing circuit 306. In particular embodiments, the power terminals 308, 310 are electrically connected to any respective nodes of the wireless transducing circuit 306 that would result in the activation of the tracking circuit 306 in response to the creation of an electrical connection between the power terminals 308, 310.

In some examples, after a tape node is turned on, it will communicate with the network service to confirm that the user/operator who is associated with the tape node is an authorized user who has authenticated himself or herself to the network service 54. In these examples, if the tape node cannot confirm that the user/operator is an authorized user, the tape node will turn itself off.

Deployment of Tape Nodes

Figure 7:
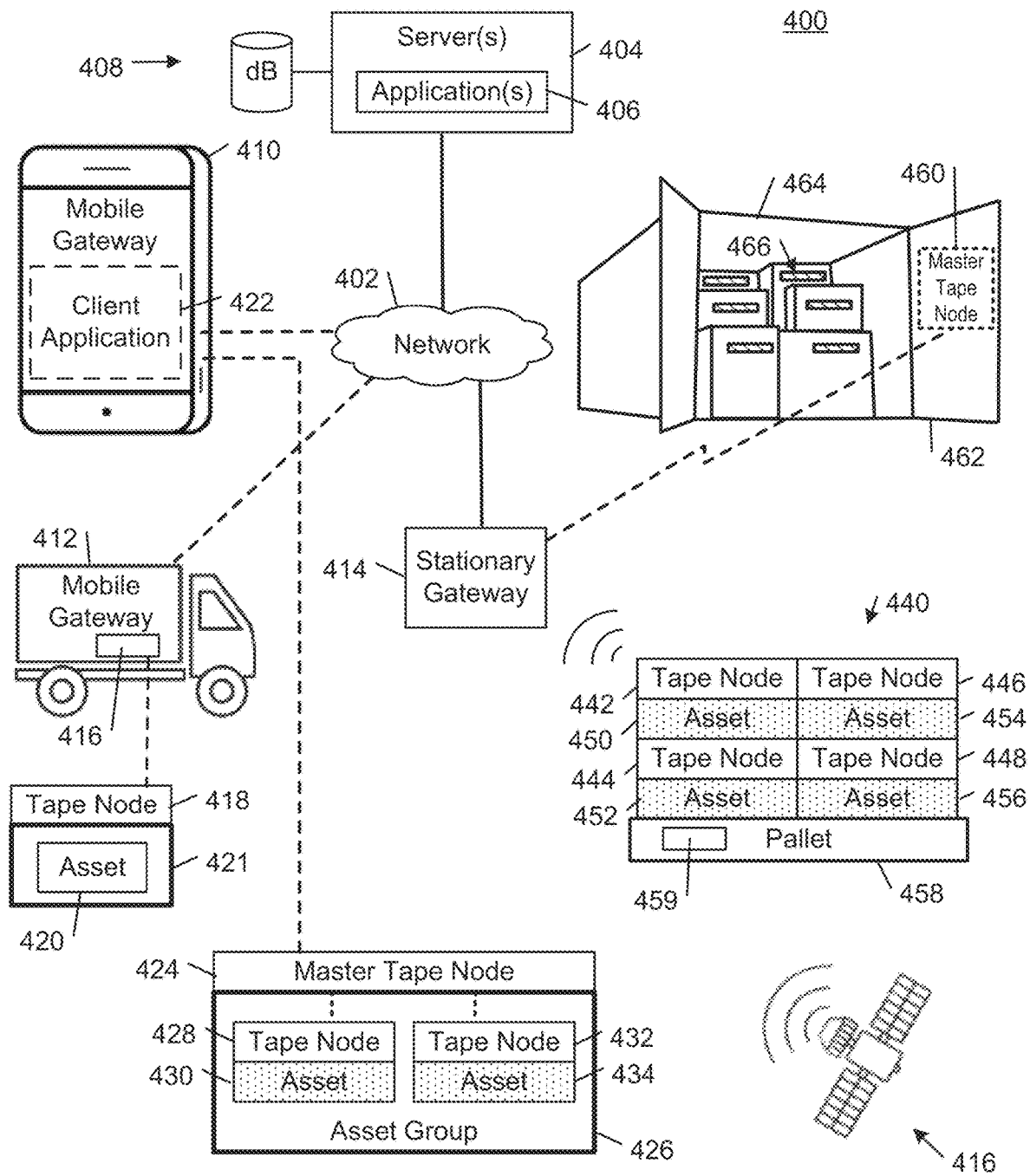
FIG. 7 is a diagrammatic view of an example of a network environment supporting communications with segments of an adhesive tape platform, according to some embodiments.

FIG. 7 shows an example network communications environment 400 (also referred to herein as an "TOT system" 400) that includes a network 402 that supports communications between one or more servers 404 executing one or more applications of a network service 408, mobile gateways 410, 412, a stationary gateway 414, and various types of tape nodes that are associated with various assets (e.g., parcels, equipment, tools, persons, and other things). Each member of the IOT system 400 may be referred to as a node of the IOT system 400, including the tape nodes, other wireless IOT devices, gateways (stationary and mobile), client devices, and servers. In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 416 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated from a roll or sheet and adhered to a asset, or other stationary or mobile object (e.g., a structural element of a warehouse, or a vehicle, such as a delivery truck) or stationary object (e.g., a structural element of a building). This process activates the tape node and causes the tape node to communicate with a server 404 of the network service 408. In this process, the tape node may communicate through one or more other tape nodes in the communication hierarchy. In this process, the network server 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 102 (shown in FIG. 5A), and the wireless communications unit 416 is implemented by a tape node (e.g., one of tape node 103 or tape node 105, respectively shown in FIGS. 5B and 5C) that includes a lower power communications interface for communicating with tape nodes within range of the mobile gateway 412 and a higher power communications interface for communicating with the network 402. In this way, the tape nodes 418 and 416 create a hierarchical wireless network of nodes for transmitting, forwarding, bridging, relaying, or otherwise communicating wireless messages to, between, or on behalf of the peripheral tape node 418 and the network service 408 in a power-efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 408 in accordance with a hierarchical wireless network of tape nodes. In some examples, each of the peripheral tape nodes 428, 432 includes a lower power wireless communications interface of the type used in, e.g., tape node 102 (shown in FIG. 5A), and the master tape node 424 is implemented by a tape node (e.g., tape node 103, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 103 or tape node 105, respectively shown in FIGS. 5B and 5C) that is adhered to, for example, a wall, column or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the communications network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 458 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 416 communicates with each of the peripheral tape nodes 466 and communicates with the stationary gateway 415 in accordance with a hierarchical wireless network of tape nodes. In some examples, each of the peripheral tape nodes 466 includes a lower power wireless communications interface of the type used in, e.g., tape node 102 (shown in FIG. 5A), and the master tape node 460 is implemented by a tape node (e.g., tape node 103, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402. Alternatively, in some examples, the stationary gateway 414 also is operable to perform operations on the data received from the master tape node 460 with the same type of data produced by the master node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 7, there are three classes of tape nodes: a short range tape node, a medium range tape node, and a long range tape node, as respectively shown in FIGS. 5A-5C. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., a box 426 and a shipping container 460) that are associated with multiple parcels that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400. In the illustrated example, the mobile gateway tape node 412 and the stationary gateway tape node 414 are long range tape nodes. The long range tape nodes typically communicate with other nodes using a high power wireless communication protocol (e.g., a cellular data communication protocol). In some examples, the mobile gateway tape node 436 is adhered to a mobile vehicle (e.g., a truck). In these examples, the mobile gateway 412 may be moved to different locations in the environment 400 to assist in connecting other tape nodes to the server 404. In some examples, the stationary gateway tape node 414 may be attached to a stationary structure (e.g., a wall) in the environment 400 with a known geographic location. In these examples, other tape nodes in the environment can determine their geographic location by querying the gateway tape node 414.

Wireless Communications Network

Figure 8:
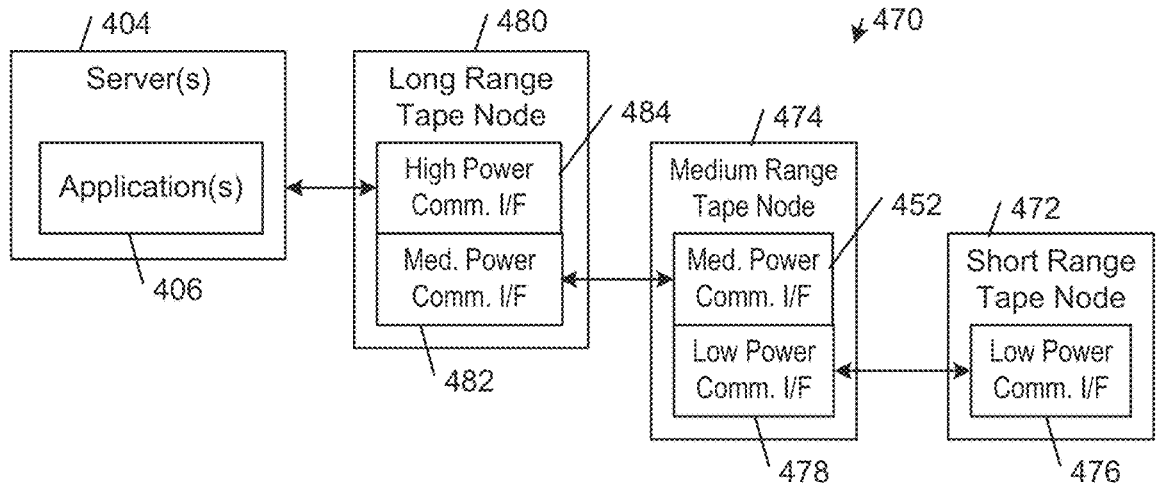
FIG. 8 is a diagrammatic view of a hierarchical communications network, according to some embodiments.

FIG. 8 shows an example hierarchical wireless communications network of tape nodes 470. In this example, the short range tape node 472 and the medium range tape node 474 communicate with one another over their respective low power wireless communication interfaces 476, 478. The medium range tape node 474 and the long range tape node 480 communicate with one another over their respective medium power wireless communication interfaces 478, 482. The long range tape node 480 and the network server 404 communicate with one another over the high power wireless communication interface 484. In some examples, the low power communication interfaces 476, 478 establish wireless communications with one another in accordance with the Bluetooth LE protocol, the medium power communication interfaces 452, 482 establish wireless communications with one another in accordance with the LoRa communications protocol, and the high power communication interface 484 establishes wireless communications with the server 404 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more assets containing respective assets. In order to conserve power, the tape nodes typically communicate according to a schedule promulgated by the server 404 of the network service 408. The schedule usually dictates all aspects of the communication, including the times when particular tape nodes should communicate, the mode of communication, and the contents of the communication. In one example, the server 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 404, either directly or indirectly through a gateway tape node (e.g., the long range tape node 416 adhered to the mobile vehicle 412 or the long range tape node 414 adhered to an infrastructure component of the environment 400). In other examples, the master tape node processes the information contained in the received data packets and transmits the processed information to the server network node 404.

Figure 9:
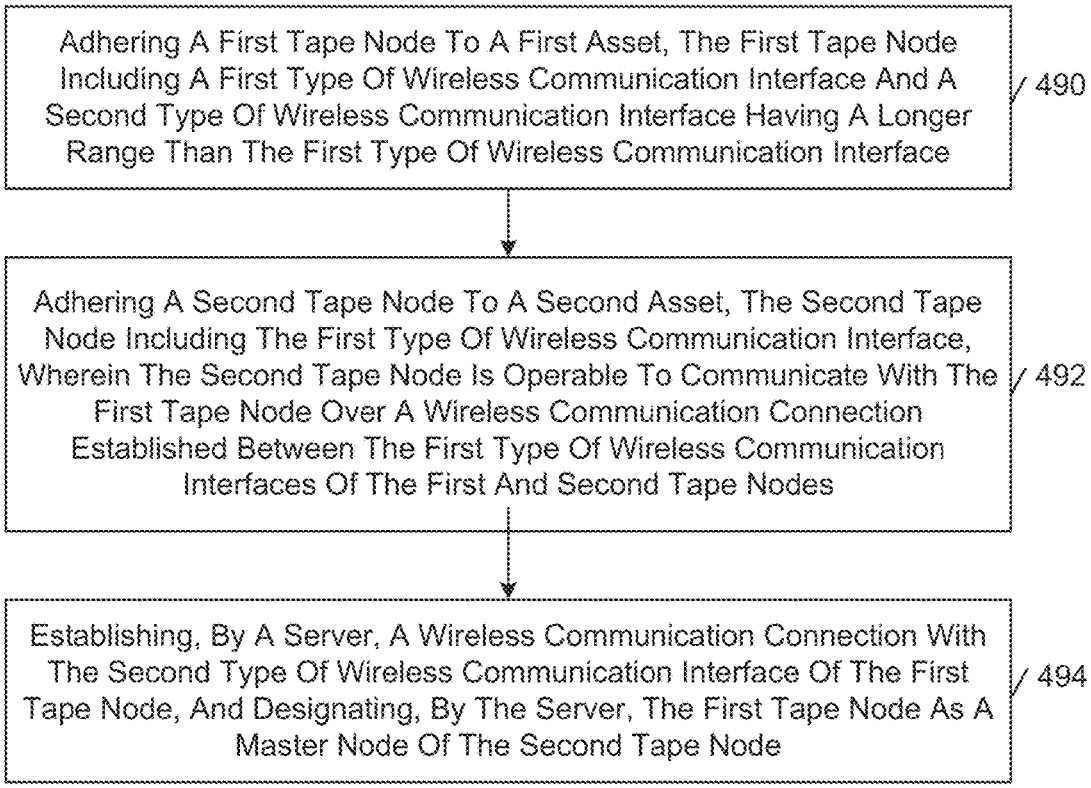
FIG. 9 is a flow diagram of a method of creating a hierarchical communications network, according to some embodiments.

FIG. 9 shows an example method of creating a hierarchical communications network. In accordance with this method, a first tape node is adhered to a first asset in a set of associated assets, the first tape node including a first type of wireless communication interface and a second type of wireless communication interface having a longer range than the first type of wireless communication interface (FIG. 9, block 490). A second tape node is adhered to a second asset in the set, the second tape node including the first type of wireless communication interface, wherein the second tape node is operable to communicate with the first tape node over a wireless communication connection established between the first type of wireless communication interfaces of the first and second tape nodes (FIG. 9, block 492). An application executing on a computer system (e.g., a server 404 of a network service 408) establishes a wireless communication connection with the second type of wireless communication interface of the first tape node, and the application transmits programmatic code executable by the first tape node to function as a master tape node with respect to the second tape node (FIG. 9, block 494).

In other embodiments, the second tape node is assigned the role of the master node of the first tape node.

Distributed Agent Operating System

As used herein, the term "node" refers to both a tape node and a non-tape node (i.e., a node or wireless device that is not an adhesive tape platform) unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node may be assigned a respective unique identifier, according to some embodiments.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives.

Nodes can be associated with items. Examples of an item includes, but are not limited to for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the items.

Communication paths between tape and/or non-tape nodes may be represented by a graph of edges between the corresponding assets (e.g., a storage unit, truck, or hub). In some embodiments, each node in the graph has a unique identifier. A set of connected edges between nodes is represented by a sequence of the node identifiers that defines a communication path between a set of nodes.

Figure 10A:
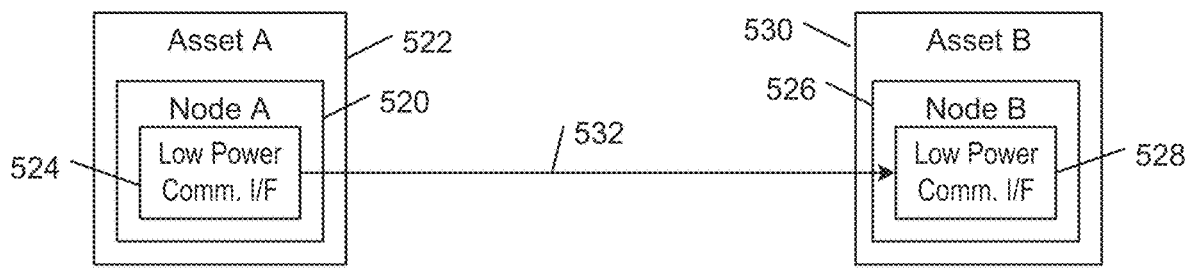
FIGS. 10A-10E are diagrammatic views of exemplary use cases for a distributed agent operating system, according to some embodiments.

Referring to FIG. 10A, a node 520 (Node A) is associated with an asset 522 (Asset A). In some embodiments, the node 520 may be implemented as a tape node that is used to seal the asset 522 or it may be implemented as a label node that is used to label the asset 522; alternatively, the node 520 may be implemented as a non-tape node that is inserted within the asset 522 or embedded in or otherwise attached to the interior or exterior of the asset 522. In the illustrated embodiment, the node 520 includes a low power communications interface 524 (e.g., a Bluetooth Low Energy communications interface). Another node 526 (Node B), which is associated with another asset 530 (Asset B), is similarly equipped with a compatible low power communications interface 528 (e.g., a Bluetooth Low Energy communications interface).

In an example scenario, in accordance with the programmatic code stored in its memory, node 526 (Node B) requires a connection to node 520 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 520 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 532 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
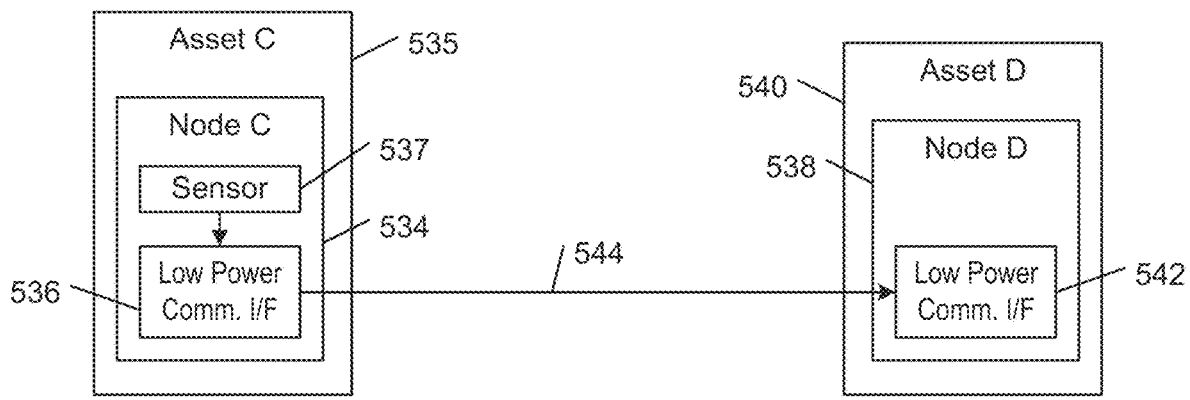

Referring to FIG. 10B, a node 534 (Node C) is associated with an asset 535 (Asset C). In the illustrated embodiment, the Node C includes a low power communications interface 536 (e.g., a Bluetooth Low Energy communications interface), and a sensor 537 (e.g., a temperature sensor). Another node 538 (Node D), which is associated with another asset 540 (Asset D), is similarly equipped with a compatible low power communications interface 542 (e.g., a Bluetooth Low Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 544 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
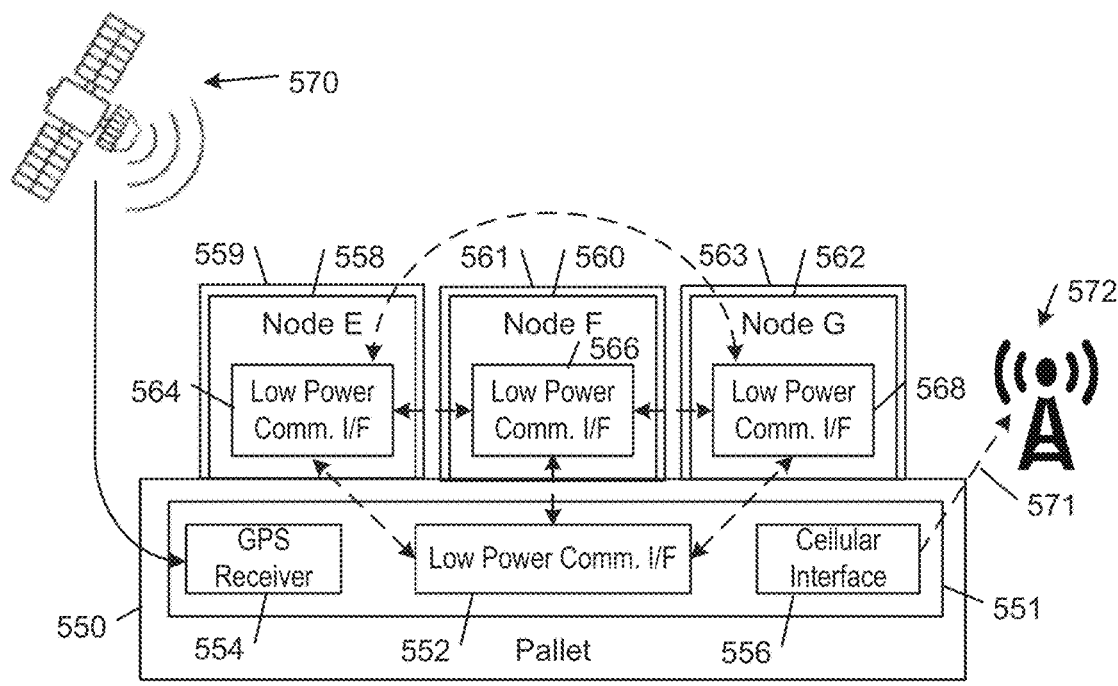

Referring to FIG. 10C, a pallet 550 is associated with a master node 551 that includes a low power communications interface 552, a GPS receiver 554, and a cellular communications interface 556. In some embodiments, the master node 551 may be implemented as a tape node or a label node that is adhered to the pallet 550. In other embodiments, the master node 551 may be implemented as a non-tape node that is inserted within the body of the pallet 550 or embedded in or otherwise attached to the interior or exterior of the pallet 550.

The pallet 550 provides a structure for grouping and containing assets 559, 561, 563 each of which is associated with a respective peripheral node 558, 560, 562 (Node E, Node F, and Node G). Each of the peripheral nodes 558, 560, 562 includes a respective low power communications interface 564, 566, 568 (e.g., Bluetooth Low Energy communications interface). In the illustrated embodiment, each of the nodes E, F, G and the master node 551 are connected to each of the other nodes over a respective low power communications path (shown by dashed lines).

In some embodiments, the assets 559, 561, 563 are grouped together because they are related. For example, the assets 559, 561, 563 may share the same shipping itinerary or a portion thereof. In an example scenario, the master pallet node 550 scans for advertising packets that are broadcasted from the peripheral nodes 558, 560, 562. In some examples, the peripheral nodes broadcast advertising packets during respective scheduled broadcast intervals. The master node 551 can determine the presence of the assets 559, 561, 563 in the vicinity of the pallet 550 based on receipt of one or more advertising packets from each of the nodes E, F, and G. In some embodiments, in response to receipt of advertising packets broadcasted by the peripheral nodes 558, 560, 562, the master node 551 transmits respective requests to the server to associate the master node 551 and the respective peripheral nodes 558, 560, 562. In some examples, the master tape node requests authorization from the server to associate the master tape node and the peripheral tape nodes. If the corresponding assets 559, 561, 563 are intended to be grouped together (e.g., they share the same itinerary or certain segments of the same itinerary), the server authorizes the master node 551 to associate the peripheral nodes 558, 560, 562 with one another as a grouped set of assets. In some embodiments, the server registers the master node and peripheral tape node identifiers with a group identifier. The server also may associate each node ID with a respective physical label ID that is affixed to the respective asset.

In some embodiments, after an initial set of assets is assigned to a multi-asset group, the master node 551 may identify another asset arrives in the vicinity of the multi-asset group. The master node may request authorization from the server to associate the other asset with the existing multi-asset group. If the server determines that the other asset is intended to ship with the multi-asset group, the server instructs the master node to merge one or more other assets with currently grouped set of assets. After all assets are grouped together, the server authorizes the multi-asset group to ship. In some embodiments, this process may involve releasing the multi-asset group from a containment area (e.g., customs holding area) in a shipment facility.

In some embodiments, the peripheral nodes 558, 560, 562 include environmental sensors for obtaining information regarding environmental conditions in the vicinity of the associated assets 559, 561, 563. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 551 can determine its own location based on geolocation data transmitted by a satellite-based radio navigation system 570 (e.g., GPS, GLONASS, and NAVSTAR) and received by the GPS receiver 554 component of the master node 551. In an alternative embodiment, the location of the master pallet node 551 can be determined using cellular based navigation techniques that use mobile communication technologies (e.g., GSM, GPRS, CDMA, etc.) to implement one or more cell-based localization techniques. After the master node 551 has ascertained its location, the distance of each of the assets 559, 561, 563 from the master node 551 can be estimated based on the average signal strength of the advertising packets that the master node 551 receives from the respective peripheral node. The master node 551 can then transmit its own location and the locations of the asset nodes E, F, and G to a server over a cellular interface connection with a cell tower 572. Other methods of determining the distance of each of the assets 559, 561, 563 from the master node 551, such as Received Signal-Strength Index (RSSI) based indoor localization techniques, also may be used.

In some embodiments, after determining its own location and the locations of the peripheral nodes, the master node 551 reports the location data and the collected and optionally processed (e.g., either by the peripheral nodes peripheral nodes 558, 560, 562 or the master node 551) sensor data to a server over a cellular communication path 571 on a cellular network 572.

In some examples, nodes are able to autonomously detect logistics execution errors if assets that suppose to travel together no longer travel together, and raise an alert. For example, a node (e.g., the master node 551 or one of the peripheral nodes 558, 560, 562) alerts the server when the node determines that a particular asset 559 is being or has already been improperly separated from the group of assets. The node may determine that there has been an improper separation of the particular asset 559 in a variety of ways. For example, the associated node 558 that is bound to the particular asset 559 may include an accelerometer that generates a signal in response to movement of the asset from the pallet. In accordance with its intelligent agent program code, the associated node 558 determines that the master node 551 has not disassociated the particular asset 559 from the group and therefore broadcasts advertising packets to the master node, which causes the master node 551 to monitor the average signal strength of the advertising packets and, if the master node 551 determines that the signal strength is decreasing over time, the master node 551 will issue an alert either locally (e.g., through a speaker component of the master node 551) or to the server.

Figure 10D:
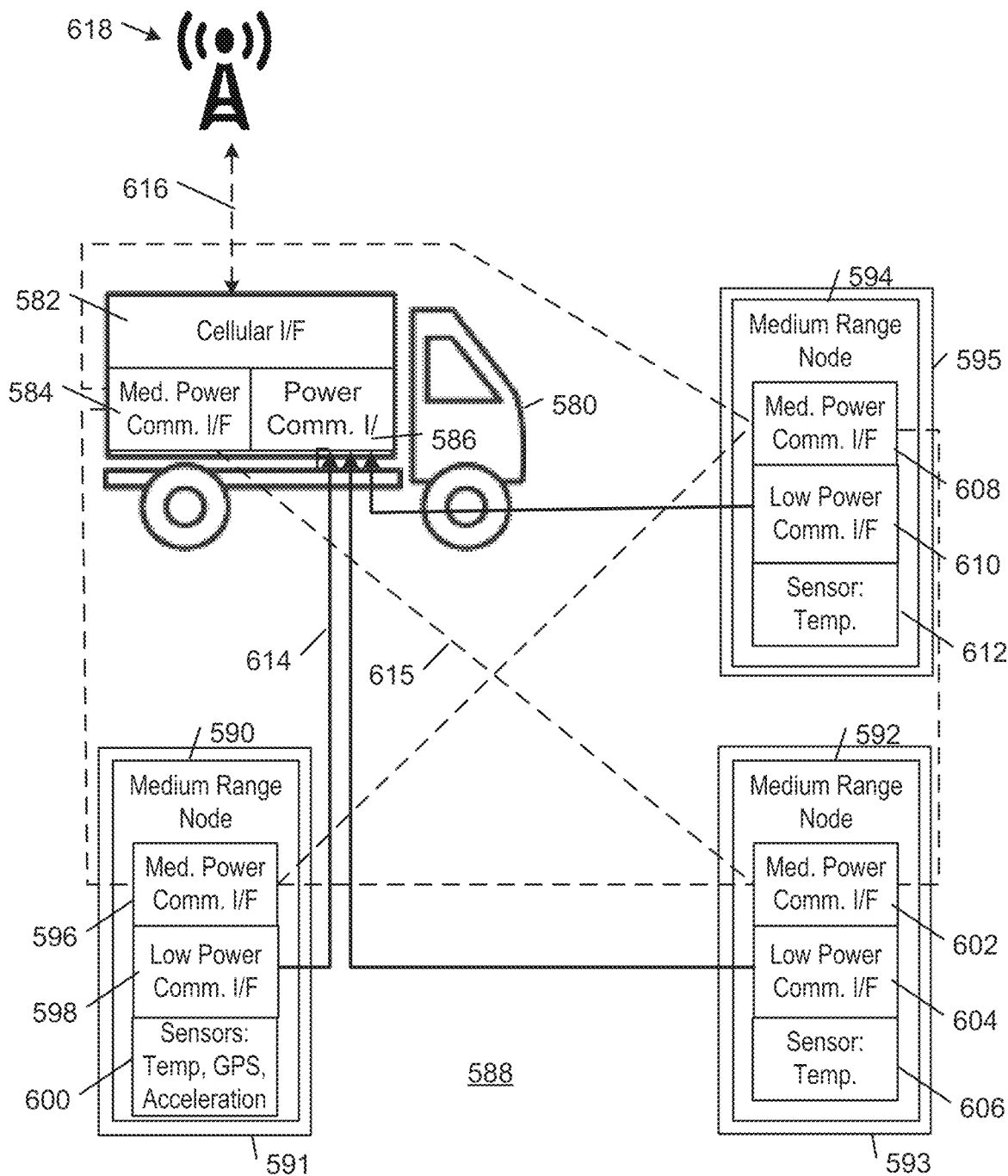

Referring to FIG. 10D, a truck 580 is configured as a mobile node or mobile hub that includes a cellular communications interface 582, a medium power communications interface 584, and a low power communications interface 586. The communications interfaces 580-586 may be implemented on one or more tape and non-tape nodes. In an illustrative scenario, the truck 580 visits a storage facility, such as a warehouse 588, to wirelessly obtain temperature data generated by temperature sensors in the medium range nodes 590, 592, 594. The warehouse 588 contains nodes 590, 592, and 594 that are associated with respective assets 591, 593, 595. In the illustrated embodiment, each node 590-594 is a medium range node that includes a respective medium power communications interface 596, 602, 608, a respective low power communications interface 598, 604, 610 and one or more respective sensors 600, 606, 612. In the illustrated embodiment, each of the asset nodes 590, 592, 594 and the truck 580 is connected to each of the other ones of the asset nodes through a respective medium power communications path (shown by dashed lines). In some embodiments, the medium power communications paths are LoRa formatted communication paths.

In some embodiments, the communications interfaces 584 and 586 (e.g., a LoRa communications interface and a Bluetooth Low Energy communications interface) on the node on the truck 580 is programmed to broadcast advertisement packets to establish connections with other network nodes within range of the truck node. A warehouse 588 includes medium range nodes 590, 592, 594 that are associated with respective containers 591, 593, 595 (e.g., assets, boxes, pallets, and the like). When the truck node's low power interface 586 is within range of any of the medium range nodes 590, 592, 594 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 590, 592, 594, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 614 or a LoRa formatted communication path 615), the truck node determines the identity information for the medium range node 590 (e.g., a peripheral node), the medium range node's capabilities include retrieving temperature data, and the medium range node's services include transmitting temperature data to other nodes. Depending of the size of the warehouse 588, the truck 580 initially may communicate with the nodes 590, 592, 594 using a low power communications interface (e.g., Bluetooth Low Energy interface). If any of the anticipated nodes fails to respond to repeated broadcasts of advertising packets by the truck 580, the truck 580 will try to communicate with the non-responsive nodes using a medium power communications interface (e.g., LoRa interface). In response to a request from the truck node 584, the medium range node 590 transmits an indication of its measured temperature data to the truck node. The truck node repeats the process for each of the other medium range nodes 592, 594 that generate temperature measurement data in the warehouse 588. The truck node reports the collected (and optionally processed, either by the medium range nodes 590, 592, 594 or the truck node) temperature data to a server over a cellular communication path 616 with a cellular network 618.

Figure 10E:
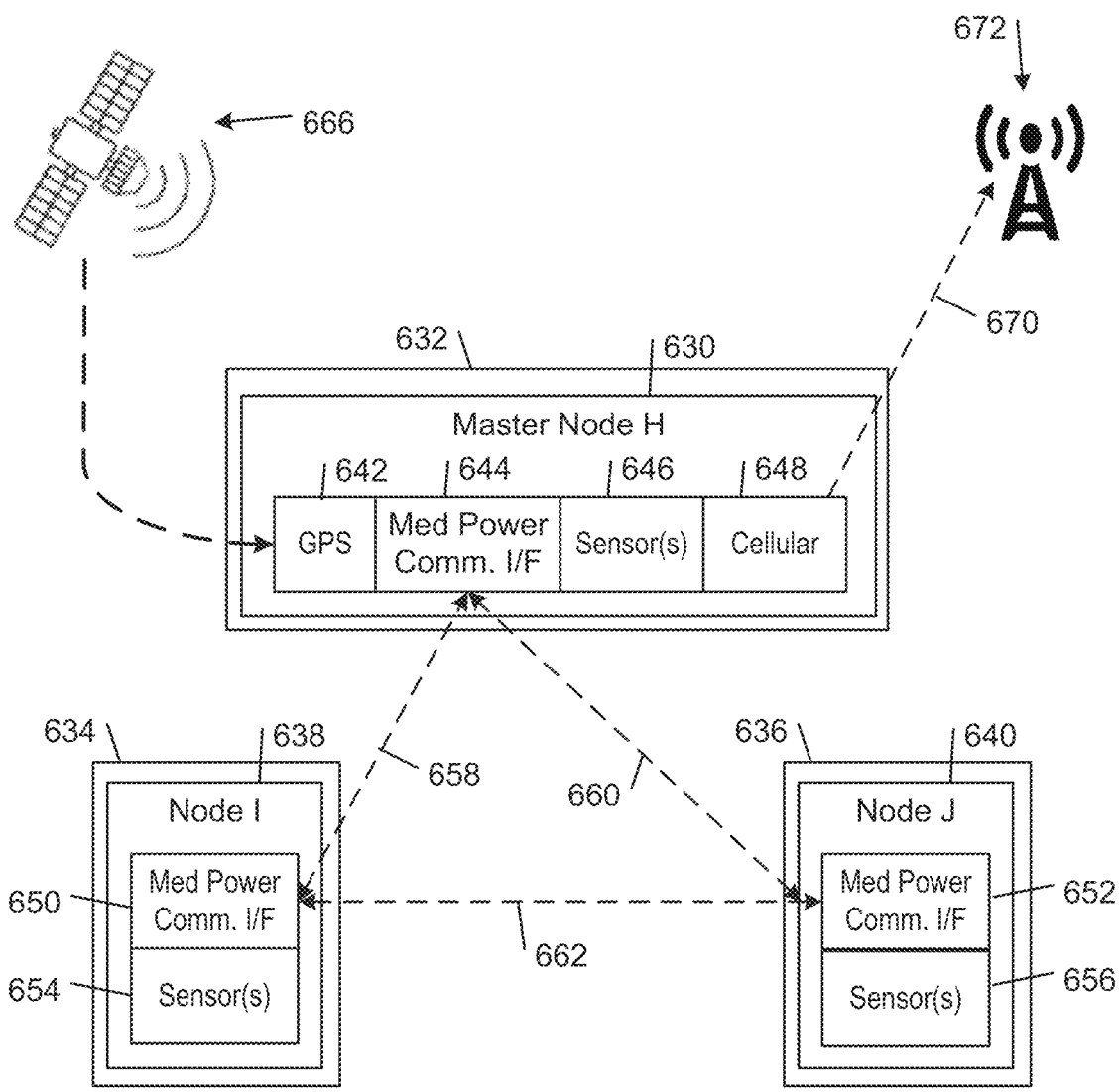

Referring to FIG. 10E, a master node 630 is associated with an item 632 (e.g., an asset) and grouped together with other items 634, 636 (e.g., assets) that are associated with respective peripheral nodes 638, 640. The master node 630 includes a GPS receiver 642, a medium power communications interface 644, one or more sensors 646, and a cellular communications interface 648. Each of the peripheral nodes 638, 640 includes a respective medium power communications interface 650, 652 and one or more respective sensors 654, 656. In the illustrated embodiment, the peripheral and master nodes are connected to one another other over respective pairwise communications paths (shown by dashed lines). In some embodiments, the nodes 630 638, 640 communicate through respective LoRa communications interfaces over LoRa formatted communications paths 658, 660, 662.

In the illustrated embodiment, the master and peripheral nodes 638, 638, 640 include environmental sensors for obtaining information regarding environmental conditions in the vicinity of the associated assets 632, 634, 636. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 630 periodically broadcasts advertising packets in the surrounding area. When the peripheral nodes 638, 640 are within range of master node 630, and are operating in a listening mode, the peripheral nodes 638, 640 will extract the address of master node 630 and potentially other information (e.g., security information) from the advertising packets. If, according to their respective programmatic code, the peripheral nodes 638, 640 determine that hey are authorized to connect to the master node 630, the peripheral nodes 638, 640 will attempt to pair with the master node 630. In this process, the peripheral nodes 638, 640 and the master node and the peripheral nodes determine each other's identities, capabilities, and services. For example, after successfully establishing a respective communication path 658, 660 with each of the peripheral nodes 638, 640 (e.g., a LoRa formatted communication path), the master node 630 determines certain information about the peripheral nodes 638, 640, such as their identity information (e.g., peripheral nodes), their capabilities (e.g., measuring temperature data), and their services include transmitting temperature data to other nodes.

After establishing LoRa formatted communications paths 658, 660 with the peripheral nodes 638, 640, the master node 630 transmits requests for the peripheral nodes 638, 640 to transmit their measured and/or locally processed temperature data to the master node 630.

In the illustrated embodiment, the master node 630 can determine its own location based on geolocation data transmitted by a satellite-based radio navigation system 666 (e.g., GPS, GLONASS, and NAVSTAR) and received by the GPS receiver 642 component of the master node 630. In an alternative embodiment, the location of the master node 630 can be determined using cellular based navigation techniques that use mobile communication technologies (e.g., GSM, GPRS, CDMA, etc.) to implement one or more cell-based localization techniques. After the master node 630 has ascertained its location, the distance of each of the assets 634, 636 from the master node 630 can be estimated based on the average signal strength of the advertising packets that the master node 630 receives from the respective peripheral node. The master node 630 can then transmit its own location and the locations of the asset nodes E, F, and G to a server over a cellular interface connection with a cell tower 672. Other methods of determining the distance of each of the assets 634, 636 from the master node 630, such as Received Signal-Strength Index (RSSI) based indoor localization techniques, also may be used.

In some embodiments, after determining its own location and the locations of the peripheral nodes, the master node 630 reports the location data the collected and optionally processed (e.g., either by the peripheral nodes peripheral nodes 634, 636 or the master node 630) sensor data to a server over a cellular communication path 670 on a cellular network 672.

Tracking Reusable Supply and Shipping Assets

Figure 11:
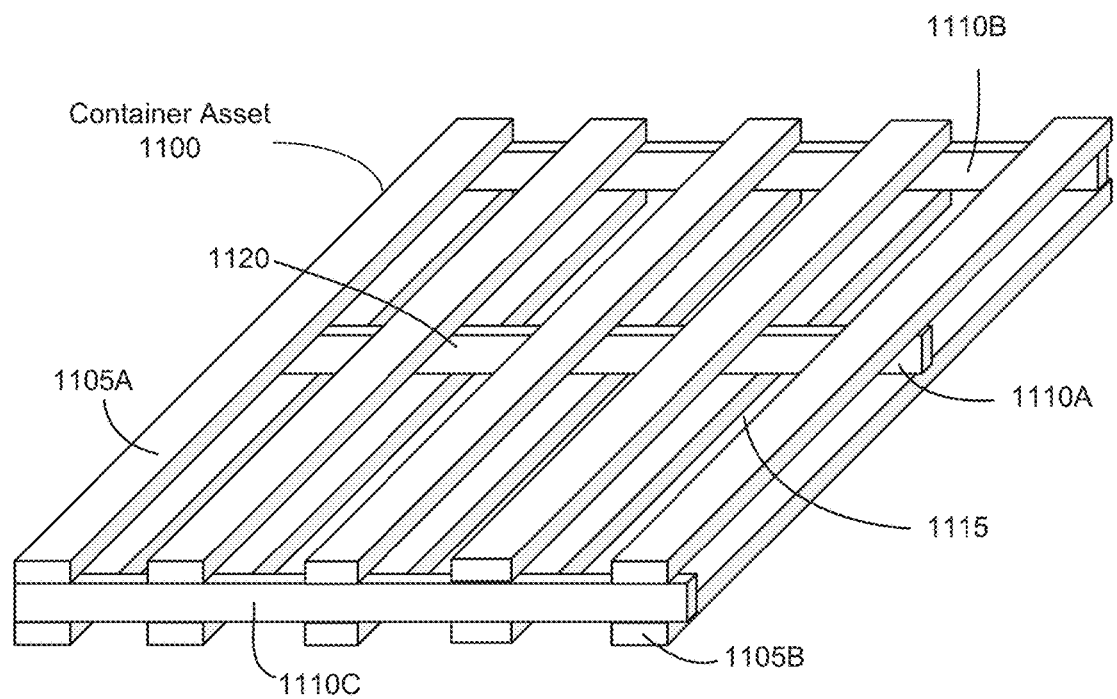
FIG. 11 is a diagrammatic view of a container asset 1100, in accordance with some embodiments.

FIG. 11 is a diagrammatic view of a container asset 1100. In the examples shown in FIGS. 11, 12, 13A-13B, 14A, 17A, 17C, the container asset 1100 is an embodiment of a pallet. However, in the present disclosure, a container asset is not limited to a pallet. For example, in other embodiments, the container asset may be a keg, a barrel, a box, a shipping container, a crate, some other type of container, a package, a rack, a cabinet, a storage container, some type of reusable asset, some type of asset that can be resupplied, or some other type of asset. The container asset 1100 comprises top and bottom sets of deck boards 1105 (including deck boards 1105A and 1105B) and a set of stringers 1110 (also referred to herein as "support poles"), including a center stringer 1110A and at least a support stringer 1110B, 1110C at each side of the pallet. In some embodiments, the pallet 1100 may have additional or fewer deck boards 1105 and stringers 1110 than shown in FIG. 11, and the deck boards and stringers may be oriented or shaped differently than shown in FIG. 11. For example, the pallet 1100 may be a plastic pallet wherein the deck boards 1105 are a single component, or the pallet may have smaller or larger gaps between the deck boards and/or the stringers 1110 than is shown.

Figure 12:
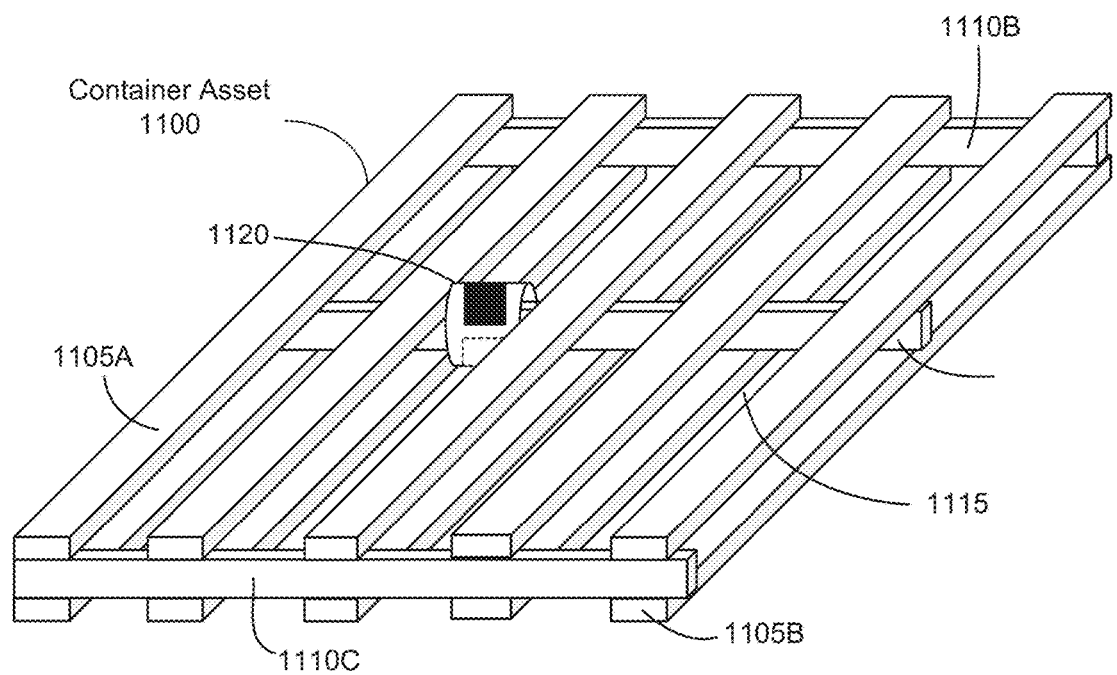
FIG. 12 is a diagrammatic view of a pallet 1100 retrofitted with a tracking device 1120, in accordance with some embodiments.

FIG. 12 is a diagrammatic view of a container asset 1100 retrofitted with a tracking device 1120, in accordance with some embodiments. The tracking device 1120 is looped around the center stringer 1110A of the container asset 1100 and positioned such that electronic components of the tracking device are oriented outward along the tracking device. In this embodiment, the tracking device 1120 is a wireless tracking device that has a form factor corresponding to a flexible belt. The tracking device may include components that correspond to those shown in FIG. 3, according to some embodiments. In further embodiments, the tracking device 1120 includes a weight sensor configured to measure the weight of an object placed on top of the tracking device 1120. Thus, the tracking device 1120 may determine the weight of cargo assets that are placed on the container asset 1110. An example of a weight sensor weight sensor may include a pressure sensor, a load cell, a force sensor, a capacitance-based weight sensor, a resistance based weight sensor, a strain sensor, or some other type of weight sensor. In further embodiments, the weight sensor is a flexible weight sensor that is configured to be operational after being bent. Embodiments of the tracking device 1120 that have a form factor of a flexible belt is described in further detail in U.S. Non-Provisional patent application Ser. No. 17/648, 917, filed Jan. 25, 2022, titled "Wireless Tracking Belts for Asset Tracking", which is incorporated by reference herein in its entirety.

Figure 13A:
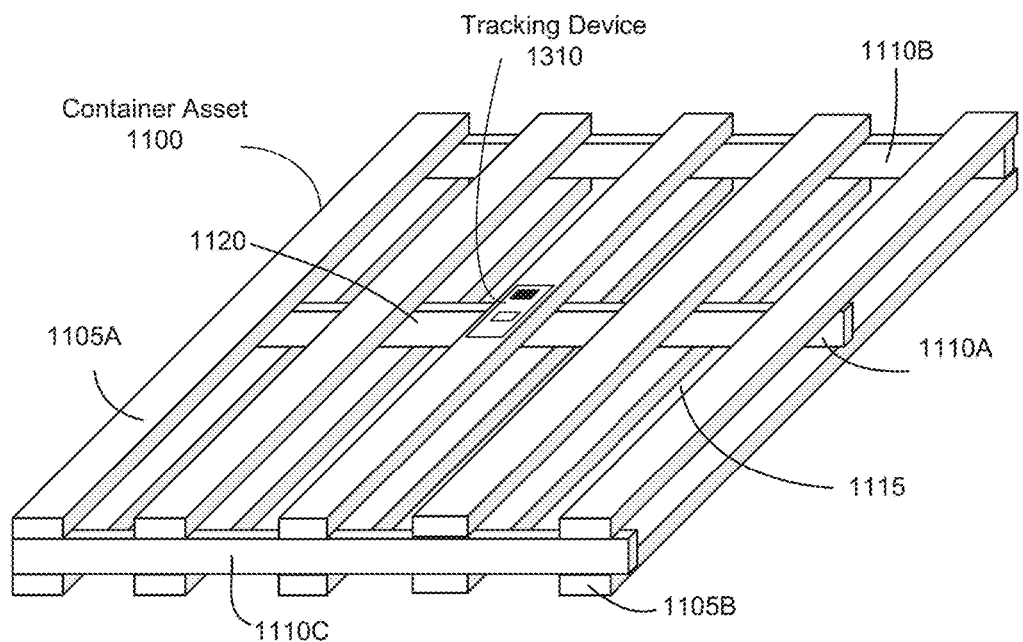
FIG. 13A is a diagrammatic view of a pallet 1100 retrofitted with a tracking device 1310, in accordance with some embodiments.
Figure 13B:
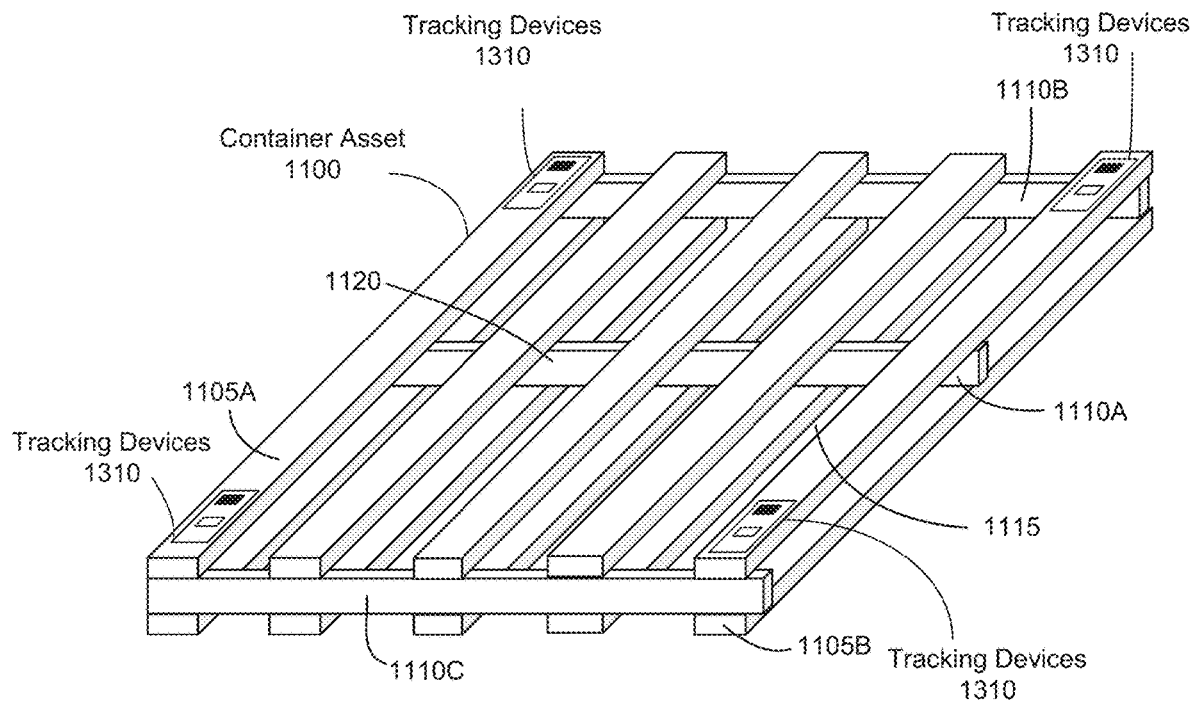
FIG. 13B is a diagrammatic view of a pallet 1100 retrofitted with four of the tracking device 1310, in accordance with some embodiments.

FIG. 13A is a diagrammatic view of a container asset 1100 retrofitted with a tracking device 1310, in accordance with some embodiments. In this case, the tracking device 1310 is an embodiment of the adhesive tape platform discussed above, with respect to FIGS. 1-6C. The tracking device 1310 is attached to a portion of the container asset 1100. Although the tracking device 1310 is shown in FIG. 13A to be attached to one of the deck boards 1105, the tracking device 1310 may be positioned on a different portion of the container asset 1100, such as the center stringer 1110A. FIG. 13B is a diagrammatic view of a container asset 1100 retrofitted with four of the tracking device 1310, in accordance with some embodiments. Each of the tracking devices 1310 corresponds to an embodiment of a segment of the adhesive tape platform 13. In other embodiments, the tracking device 1310 is a different type of tracking device that is capable of wireless communication. For example, the tracking device 1310 may have a rigid form factor or may be a wireless tracking belt. In some cases, the tracking device 1310 includes a sensor, such as a weight sensor, a magnetic field sensor, a light sensor, or some other type of sensor. The tracking device 1310 is used to track the container asset. The tracking device 1310 is configured to wirelessly communicate with one or more members of the asset tracking system 400.

Figure 13C:
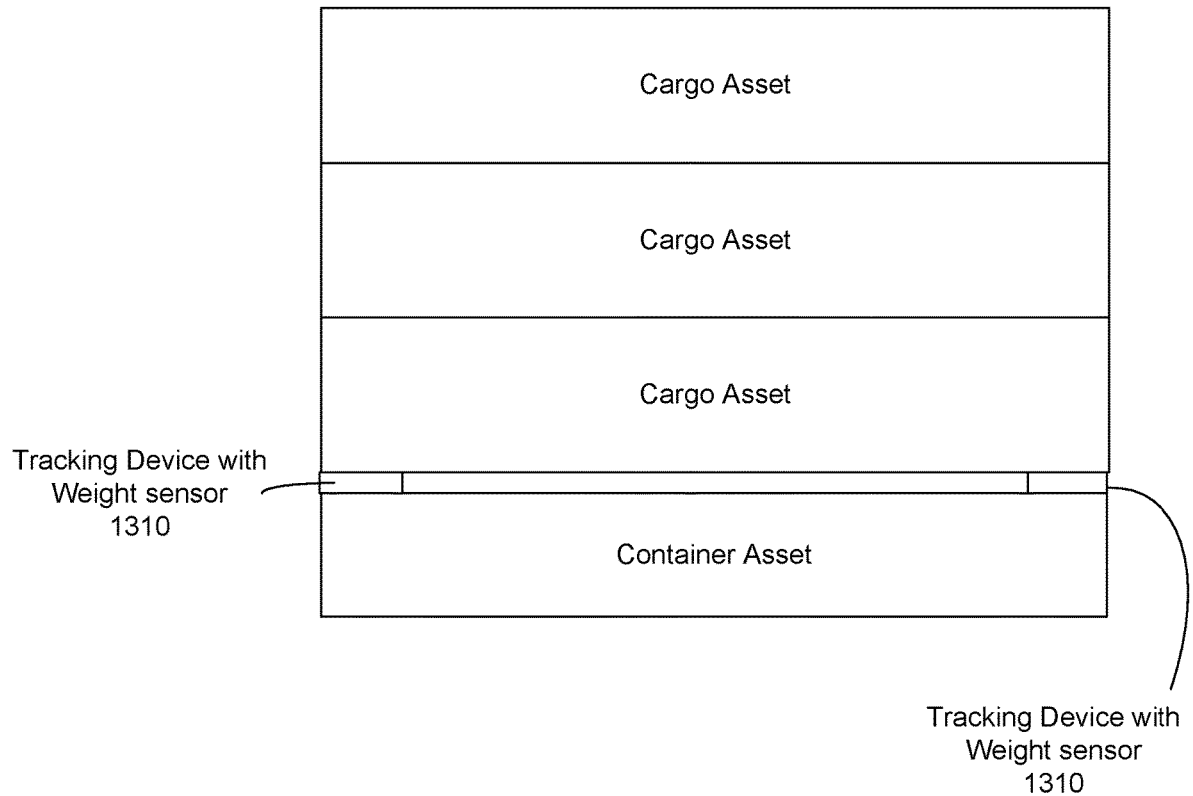
FIG. 13C is a diagram showing a container asset 1100 and a plurality of cargo assets that have been loaded onto the container asset 1100, in accordance with some embodiments.

FIG. 13C is a diagram showing a container asset 1100 and a plurality of cargo assets that have been loaded onto the container asset 1100, in accordance with some embodiments. The container asset 1100 includes the four tracking devices 1310 as shown in FIG. 13B. In the example of FIG. 13A, four tracking devices 1310 are used, but in other embodiments the container asset 1100 may include a different number of tracking devices. In the embodiment shown in FIG. 13A each of the four tracking devices 1310 includes a weight sensor. The four tracking devices 1310 are configured to determine the weight of cargo assets, when the cargo assets are loaded onto the container asset. In some embodiments, one or more of the cargo assets are loaded in a position where the one or more cargo assets are on top of at least one tracking device 1310. The weight of the cargo assets is determined based on measurements from the weight sensors of at least one of the four tracking devices 1310. The current weight of the cargo assets at a given time can be determined based on the measurements from the tracking devices 1310 and transmitted to another member of the asset tracking system 400 (e.g., the cloud or server) by one of the four tracking devices 1310. In some embodiments, one of the four tracking devices 1310 is assigned the role of a master node with the other three tracking being assigned a role of a sub node. In further embodiments, the master node communicates data from the four tracking devices with other members of the asset tracking system 400. Each sub node may only communicate with the other three tracking devices 1310, in some embodiments. In some embodiments, the master node is assigned to a tracking device 1310 with the highest battery charge level. When the battery charge level of the master node falls below a threshold level, the master node role may be assigned to a different tracking device 1310. In some embodiments, more than one tracking device may be assigned the master node role.

Figure 13D:
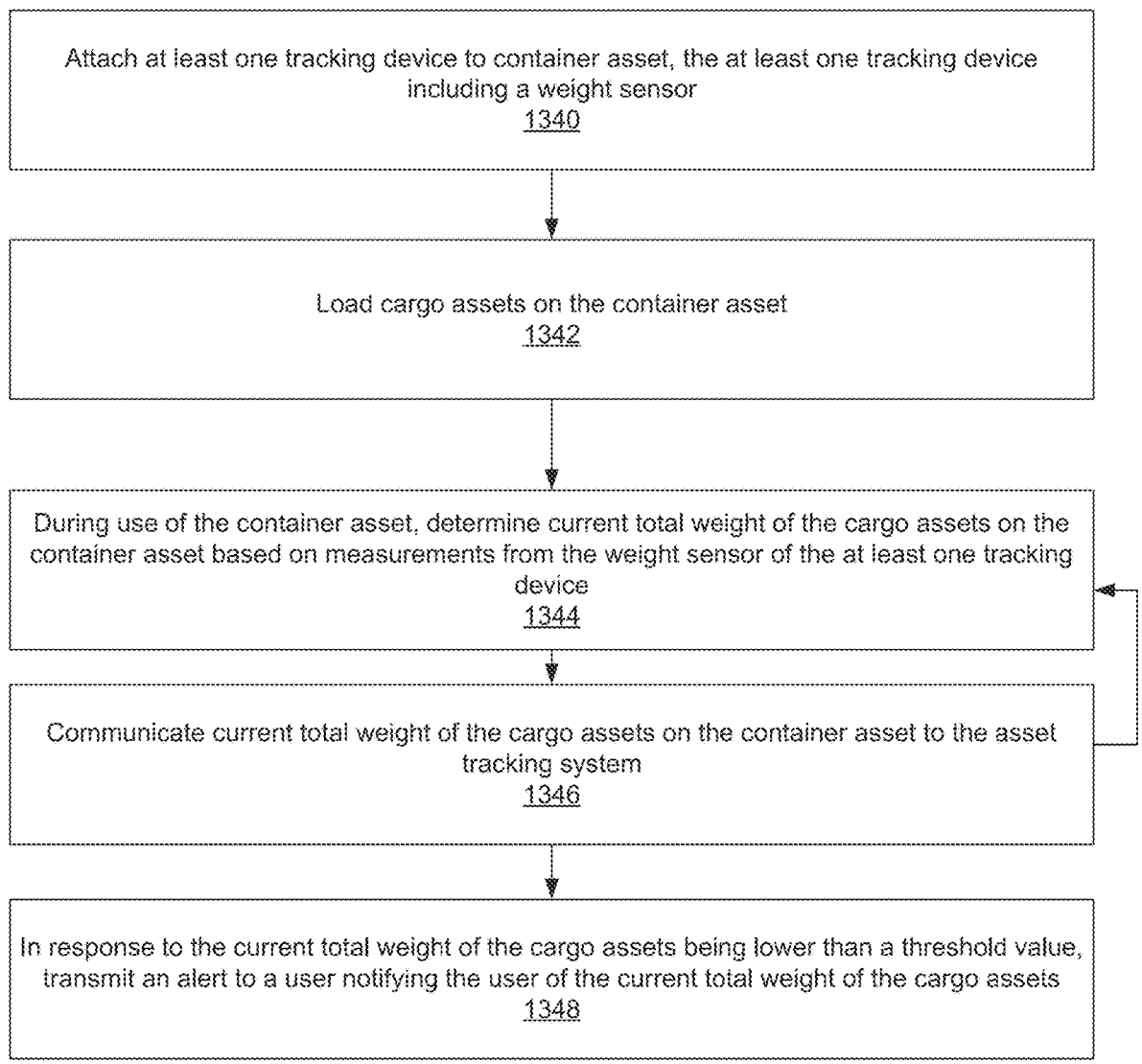
FIG. 13D is a diagrammatic flow chart of a method for determining the weight of cargo assets stored on a container asset, according to some embodiments.

FIG. 13D is a diagrammatic flow chart of a method for determining the weight of cargo assets stored on a container asset, according to some embodiments. The method includes attaching 1340 at least one tracking device to container asset, the at least one tracking device including a weight sensor. In some embodiments, the at least one tracking device is an embodiment of the tracking device 1310 and has a flexible adhesive tape form factor. After, cargo assets are loaded 1342 on the container asset. The cargo assets may be stored on the container asset. In some embodiments, a user may be tracking an inventory of the cargo assets using the asset tracking system 400. For example, the cargo assets may include a plurality of items that need to be resupplied when the items are low on stock or out of stock.

During use of the container asset, the current total weight of the cargo assets on the container asset is determined 1344 based on measurements from the weight sensor of the at least one tracking device. One of the at least one tracking device communicates 1346 the current total weight of the cargo assets on the container asset to the asset tracking system 400. The communication may occur based on a schedule of communication. For example, the one tracking device may communicate the current total weight of the cargo assets once a day, every hour, or on some other schedule. In other embodiments, the one tracking device communicates the weight of the cargo assets in response to an event (e.g., the total weight of the cargo assets changing). The event may correspond to an event detected by the at least one tracking device. For example, the event may include the at least one tracking device detecting that its position has changed, detecting a change in velocity, receiving an alert from the asset tracking system 400, or some other event. The steps 1344 and 1346 may be repeated a number of times throughout the usage of the container asset.

In response to the current total weight of the cargo assets being lower than a threshold value, one of the at least one tracking device transmits 1348 an alert to a user notifying the user of the current total weight of the cargo assets. The total weight of the cargo assets may correlate to an available stock of the cargo assets, in some embodiments. For example, the total weight of the cargo assets being below the threshold value may correspond to a certain amount of an item being used up, sold, shipped, unaccounted for, or otherwise unavailable. Using the asset tracking system 400 and the tracking devices on the container assets, a user is able to track the cargo assets and be alerted of changes to an inventory. Since the tracking devices can be attached or retrofitted to any container asset, this can save the user effort, costs, and time, in comparison to replacing an existing inventory of container assets with container assets that have integrated tracking devices.

Figure 14A:
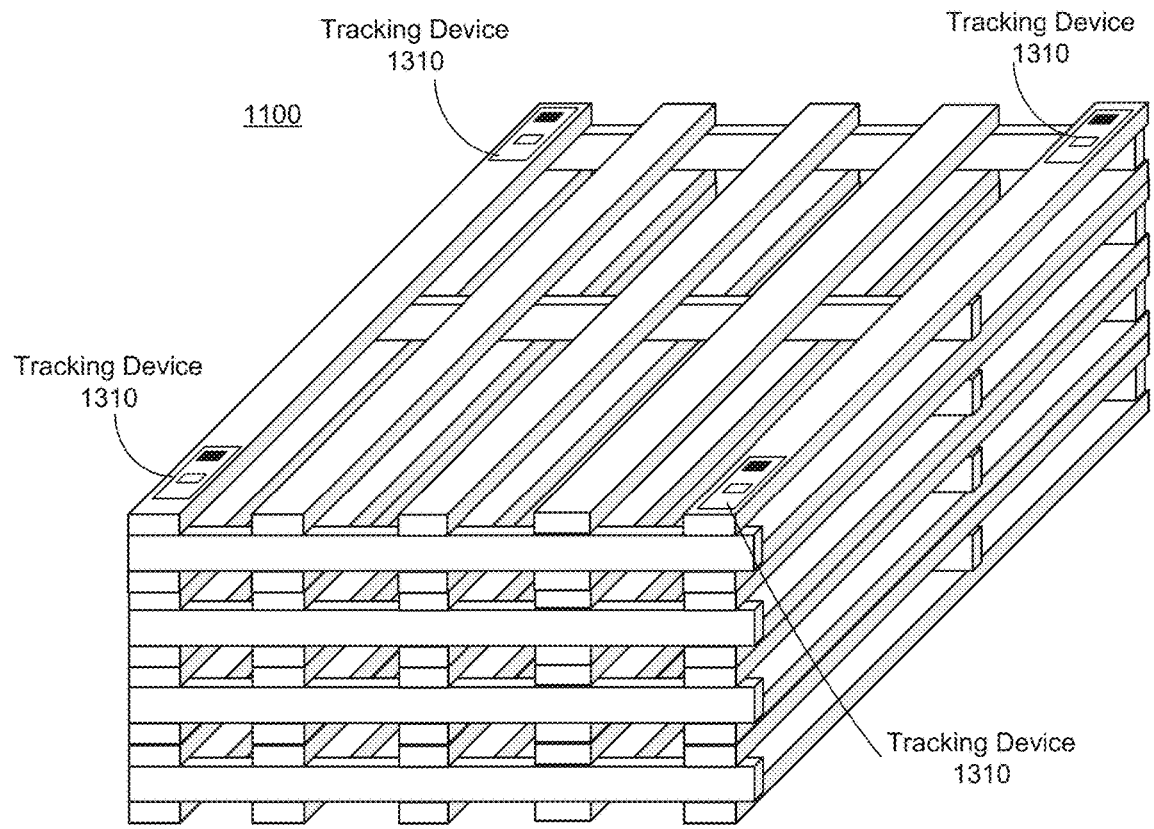
FIG. 14A shows a grouping of container assets, with at least one of the container assets including one or more tracking devices 1310.
Figure 14B:
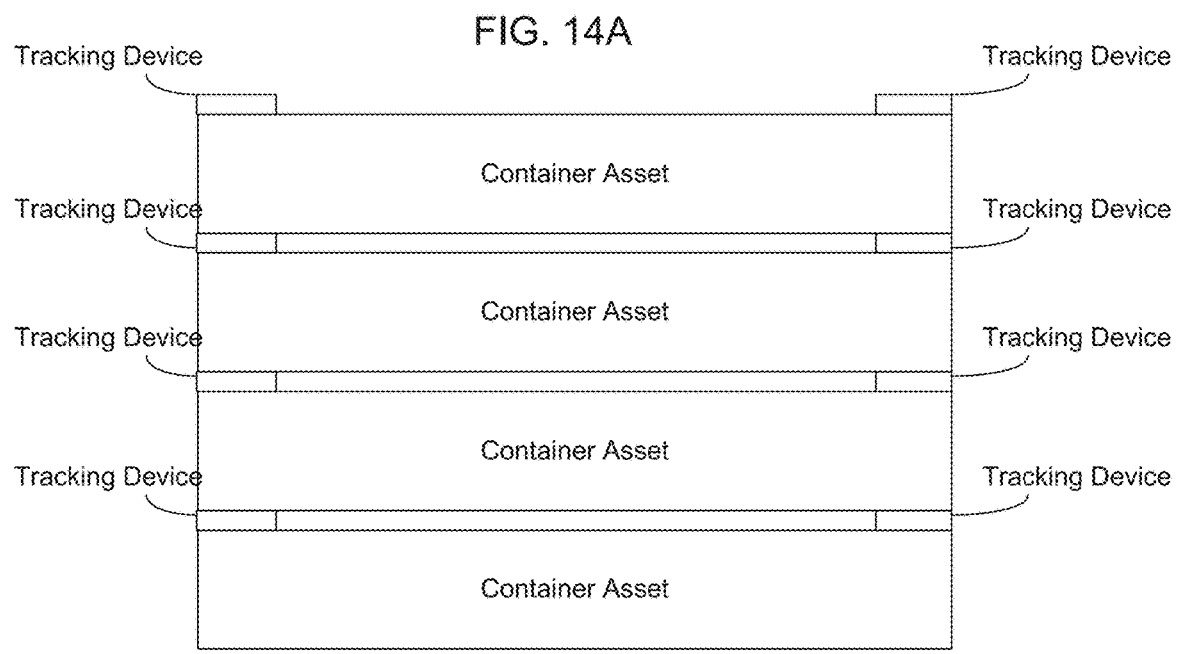

FIG. 14A shows a grouping of container assets, with at least one of the container assets including one or more tracking devices 1310. FIG. 14B is a block diagram corresponding to the grouping of container assets shown in FIG. 14A. In the embodiment of FIG. 14B, each container asset in the grouping of container assets includes at least one tracking device attached to the top of the container asset.

Figure 15:
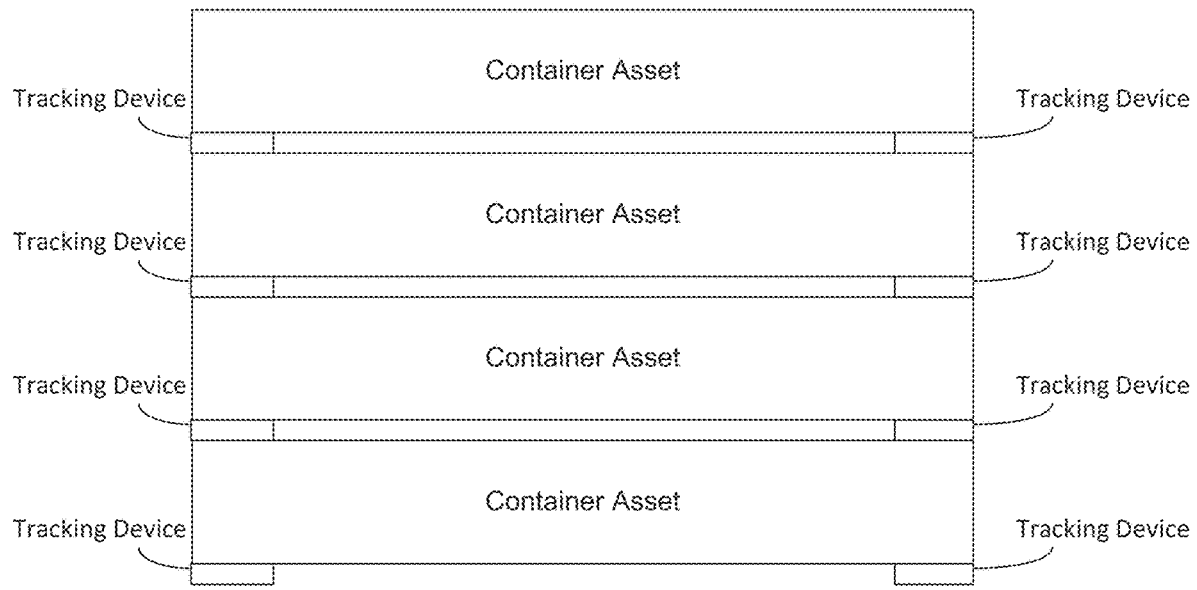
FIG. 15 shows an alternate embodiment of the grouping of container assets.
Figure 16:
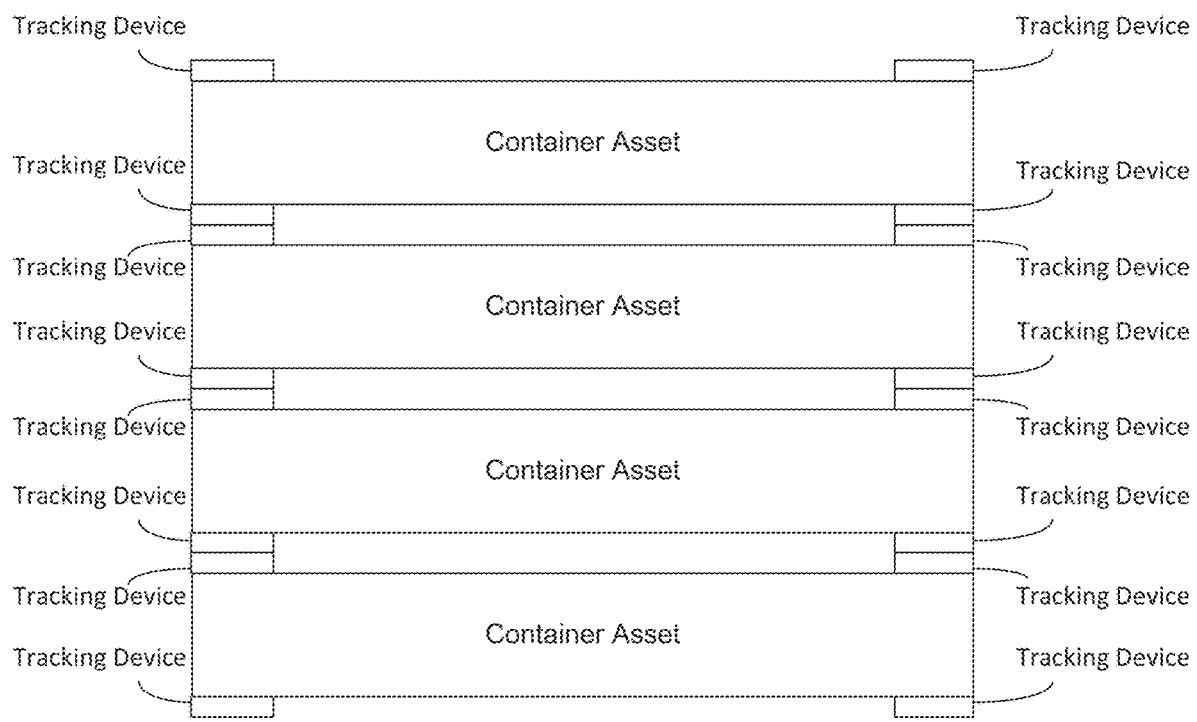
FIG. 16 shows an alternate embodiment of the grouping of container assets.

FIG. 15 shows an alternate embodiment of the grouping of container assets. In the embodiments of FIG. 15, each container asset of the grouping of container assets includes at least one tracking device attached to the bottom of the container asset. FIG. 16 shows an alternate embodiment of the grouping of container assets. In the embodiment of FIG. 16, each container asset of the grouping of container assets includes at least one tracking device attached to the bottom of the container asset and at least one tracking device attached to the top of the container asset.

Tracking Groupings of Assets

In the embodiments of FIGS. 14A-14B, 15, and 16, the tracking devices are configured to detect the other tracking devices in the grouping of container assets and determine a manifest of container assets in the grouping. In these examples, the tracking devices are shown to be exposed on the exterior of the container assets, however, in some embodiments, at least a portion of the tracking devices are positioned on the interior of the container assets. This may be done to protect sensitive portions of the tracking devices from physical damage that may occur on the exterior of the container assets, with the container asset itself providing protection for the tracking device. The manifest of container assets in the grouping includes a list of asset identifiers, each identifier corresponding to one of the container assets in the grouping. Each tracking device may store the asset identifier for the container asset that the tracking device is attached to and may also communicate the stored asset identifier to other tracking devices. One of the tracking devices transmits the manifest to another member of the asset tracking system 400 (e.g., the cloud or server). In some embodiments, one of the tracking devices is assigned a role as a master node. In further embodiments, the master node is responsible for communicating with the asset tracking system 400 including transmitting the manifest. The manifest is updated as container assets are added and removed from the grouping of the container assets.

In some embodiments, the grouping is a vertical stacking of container assets. A tracking device associated with a container asset is configured to detect which container assets are in the same vertical stacking as the container asset. The tracking device may detect that another container asset is stacked above or below the associated container asset based on determining a position of one or more tracking devices on the other container asset. For example, the tracking device may determine the position of the one or more tracking devices on the other container asset based on a wireless communication connection with the one or more tracking devices on the other container asset. The tracking device may determine the position of the asset based on the received signal strength of wireless communications received from the one or more tracking devices on the other container asset. In other embodiments, the tracking device may receive a position of the other container asset from the one or more tracking devices on the other container asset. In some embodiments, the tracking device may determine its own position using GPS communication system or by other locationing methods. In some embodiments, the tracking device may determine its own position based on relative signal strength measurements of a connection with one or more wireless communication devices including wireless communication devices besides the tracking devices on the container assets (e.g., a gateway device, a WiFi access point, a cellular tower, etc.).

In one example, the tracking device may determine that the other container asset is stacked above the associated container asset based on identifying that a plurality of tracking devices all correspond to the same asset identifier and have a position that corresponds to being above or below the associated container asset. In some embodiments, the tracking devices include magnetic sensors. Some of the tracking devices may include magnets or magnetic field transmitters that can be detected by the magnetic sensors when the container assets are stacked on top of each other. Thus, a tracking device attached to an associated container asset may detect that other container assets are stacked on the associated container based on detected magnetic field signals.

Figure 17A:
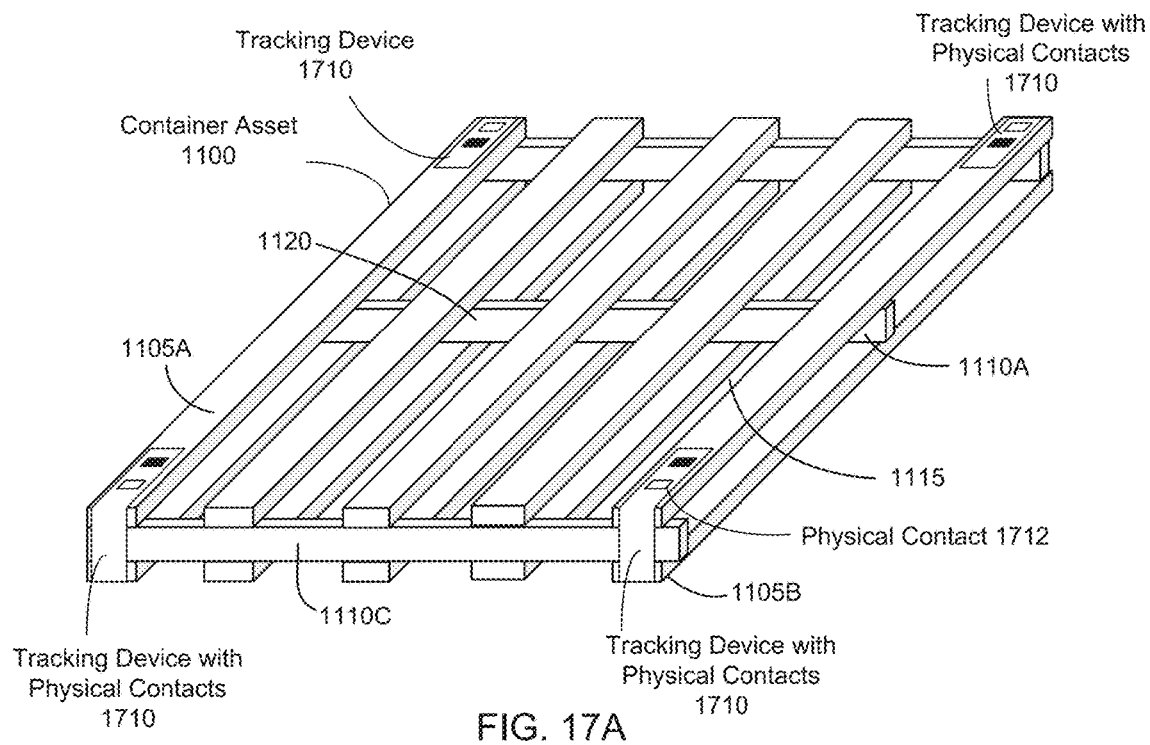
FIG. 17A shows a container asset 1100 that is retrofitted with a tracking device 1710 with physical contacts 1712, in accordance with some embodiments.
Figure 17B:
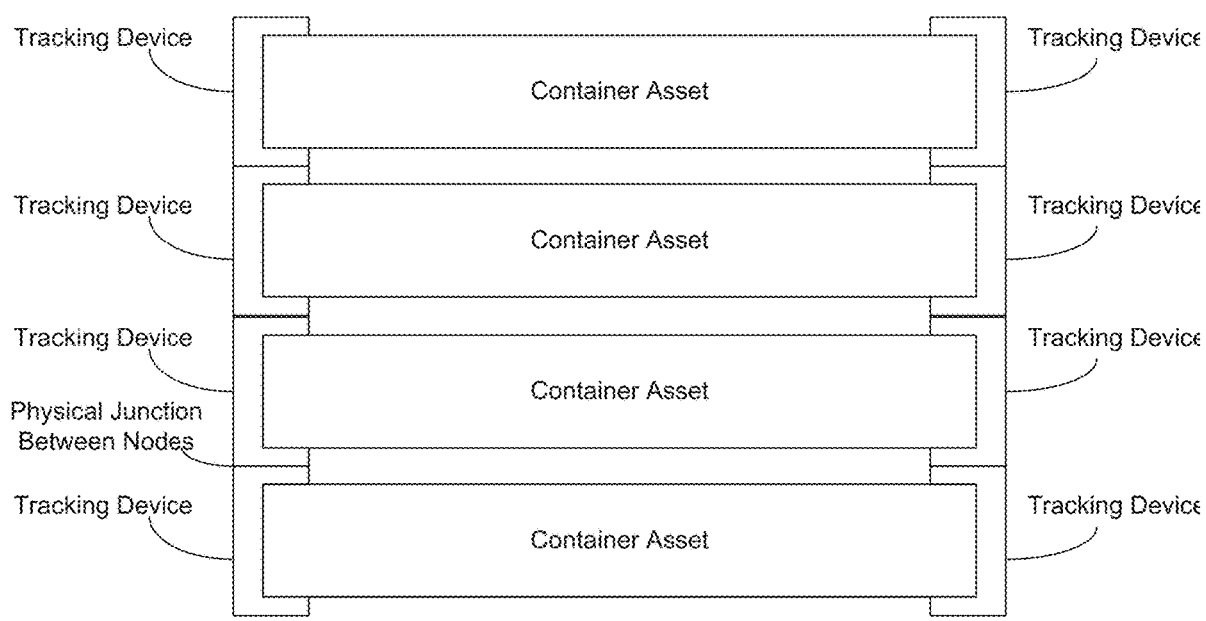
FIG. 17B is a block diagram illustrating the connection between physical contacts 1712 of the tracking devices 1710 in FIG. 17A when the container assets with tracking devices 1710 are in a stack, in accordance with some embodiments.

In some embodiments, a tracking device attached to an associated container asset is configured to connect with and communicate with tracking devices that are on container assets immediately above or immediately below the associated container asset. In this case, each tracking device may communicate in a chain upwards or downwards through the stack. The manifest may be transmitted up and/or down the stack, with each tracking device that receives the manifest updating the manifest. A master node may receive the complete manifest and transmit the complete manifest to the asset tracking system 400, according to some embodiments. In some embodiments, the master node may be the top most container asset on the stack or the bottom most container asset on the stack. The master node may also correspond to a tracking device that is closest to a gateway device that receives the communications from the master node, according to some embodiments. In some embodiments, the master node role may additionally be based on the battery life of each tracking device in the grouping of container assets FIG. 17A shows a container asset 1100 that is retrofitted with a tracking device 1710 with physical contacts 1712. The tracking device 1710 is an embodiment of the tracking device 1310 that includes at two physical contacts 1712. When the tracking device 1710 is attached to the container asset 1100, one of the physical contacts 1712 is exposed on a top side of the container asset 1100 and another physical contact (not shown) is exposed on the bottom side of the container asset 1100. The tracking devices 1710 are attached to the container assets 1100 in a configuration such that when two container assets 1100 with the tracking devices 1710 are stacked on top of each other, one of the physical contacts 1712 on the top side of the bottom container asset 1100 is contacted to one of the physical contacts 1712 on the bottom side of the top container asset 1100. FIG. 17B is a block diagram illustrating the connection between physical contacts 1712 of the tracking devices 1710 in FIG. 17A when the container assets with tracking devices 1710 are in a stack.

When the physical contacts 1712 of two tracking devices 1710 are connected, an electrical connection is made between circuits or electrical components of the two tracking devices 1710, according to some embodiments. This allows the two tracking devices 1710 to detect each other and communicate with each other.

Figure 17C:
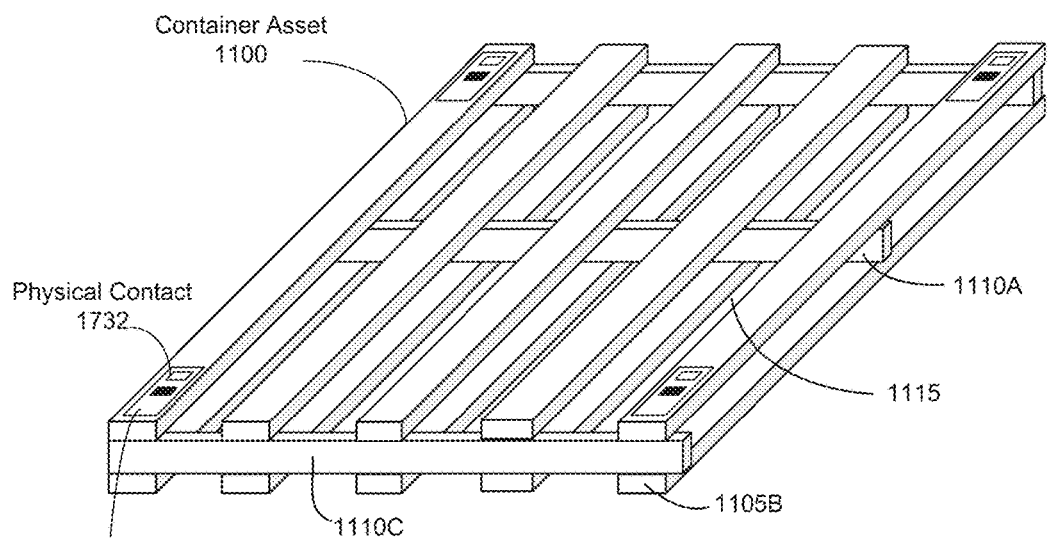
FIG. 17C shows an alternate embodiment of a container asset 1100 that is retrofitted with a tracking device 1730 with physical contacts 1732.
Figure 17D:
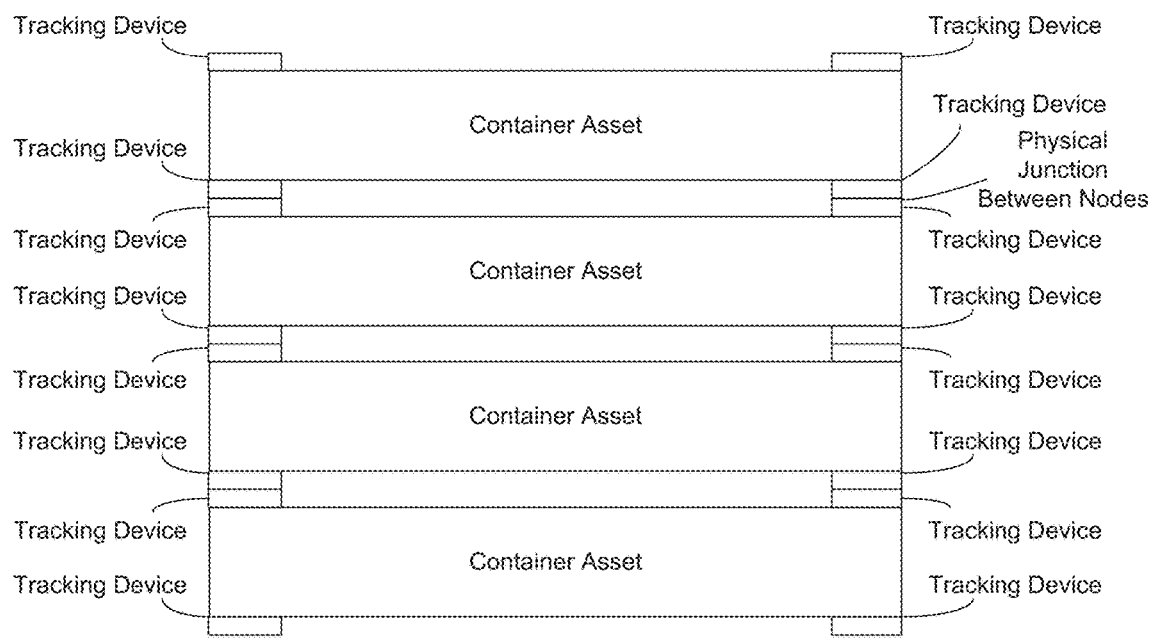
FIG. 17D is a block diagram illustrating the connection between physical contacts of the tracking devices 1730 in FIG. 17C when the container assets 1100 are stacked, in accordance with some embodiments.

FIG. 17C shows an alternate embodiment of a container asset 1100 that is retrofitted with a tracking device 1730 with physical contacts 1732. FIG. 17D is a block diagram illustrating the connection between physical contacts of the tracking devices 1730 in FIG. 17C when the container assets 1100 are stacked. The tracking device 1730 is an alternate embodiment of the tracking device 1710 that includes one physical contact 1732. In this case, separate tracking devices 1732 are attached to the top of the container asset 1100 and the bottom of the container asset 1100, such that the tracking devices 1732 can connect to tracking devices 1732 on other container assets 1100 that are stacked on top of and below the container asset 1100.

Figure 18:
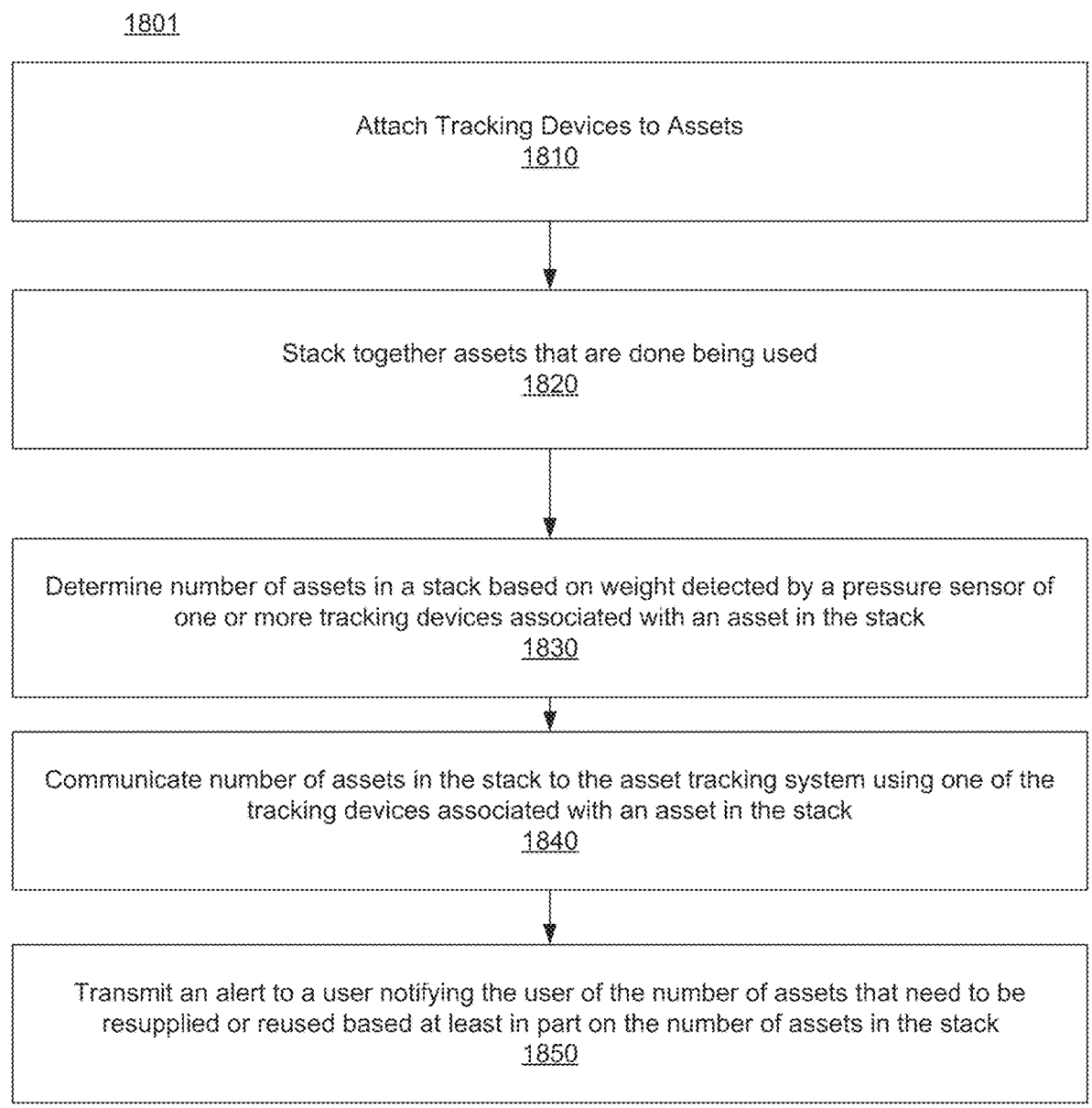
FIG. 18 is a flow chart for a method of determining a number of assets in a stack of assets, in accordance with some embodiments.

FIG. 18 is a flow chart for a method 1801 of determining a number of assets in a stack of assets, in accordance with some embodiments. The method 1801 includes attaching 1810 at least one tracking device to each asset in a plurality of assets. Assets are stacked 1820 together once the assets are done being used or have their contents emptied. A number of assets in a stack is determined 1830 based on weight detected by a pressure sensor of one or more tracking devices associated with an asset in the stack. The number of assets in the stack is communicated 1840 to the asset tracking system using one of the tracking devices associated with an asset in the stack. The one of the tracking devices may be a master node of the stack, in some embodiments. The asset tracking system transmits 1850 an alert to a user notifying the user of the number of assets that need to be resupplied or reused based at least in part on the number of assets in the stack.

FIG. 19 is a flow chart for a method 1901 of detecting assets that are grouped in proximity to each other in an arrangement, in accordance with some embodiments. In further embodiments, the arrangement is a stacking of the assets in a vertical stack. The method 1901 includes attaching 1910 at least one tracking device to each asset in a plurality of assets, each tracking device storing an asset identifier corresponding to the asset it is attached to. Assets that are finished being used or have their contents emptied are gathered 1920 into a grouping, each asset in a group being within a threshold distance from another asset in the group. Tracking devices on each grouped asset communicate 1930 with each other. A tracking device associated with an asset in the group of assets in identified 1940 as a master node or tracking device. The master tracking device determines 1950 a manifest of the asset identifiers for each asset in the grouping of assets. The master tracking device communicates 1960 the manifest of the asset identifiers to the asset tracking system. The asset tracking system stores 1970 the number of assets that have been used in a database of the asset tracking system and (optionally) displays the information from the database on a user's client device.

Figure 20A:
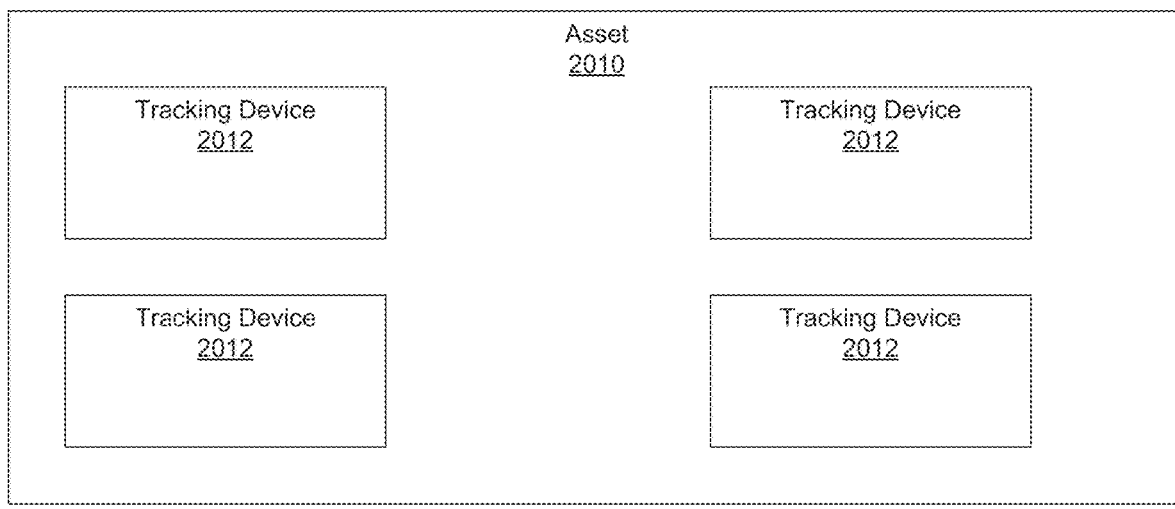
FIGS. 20A-20C are block diagrams showing a hierarchy of tracking devices, in accordance with some embodiments.
Figure 20B:
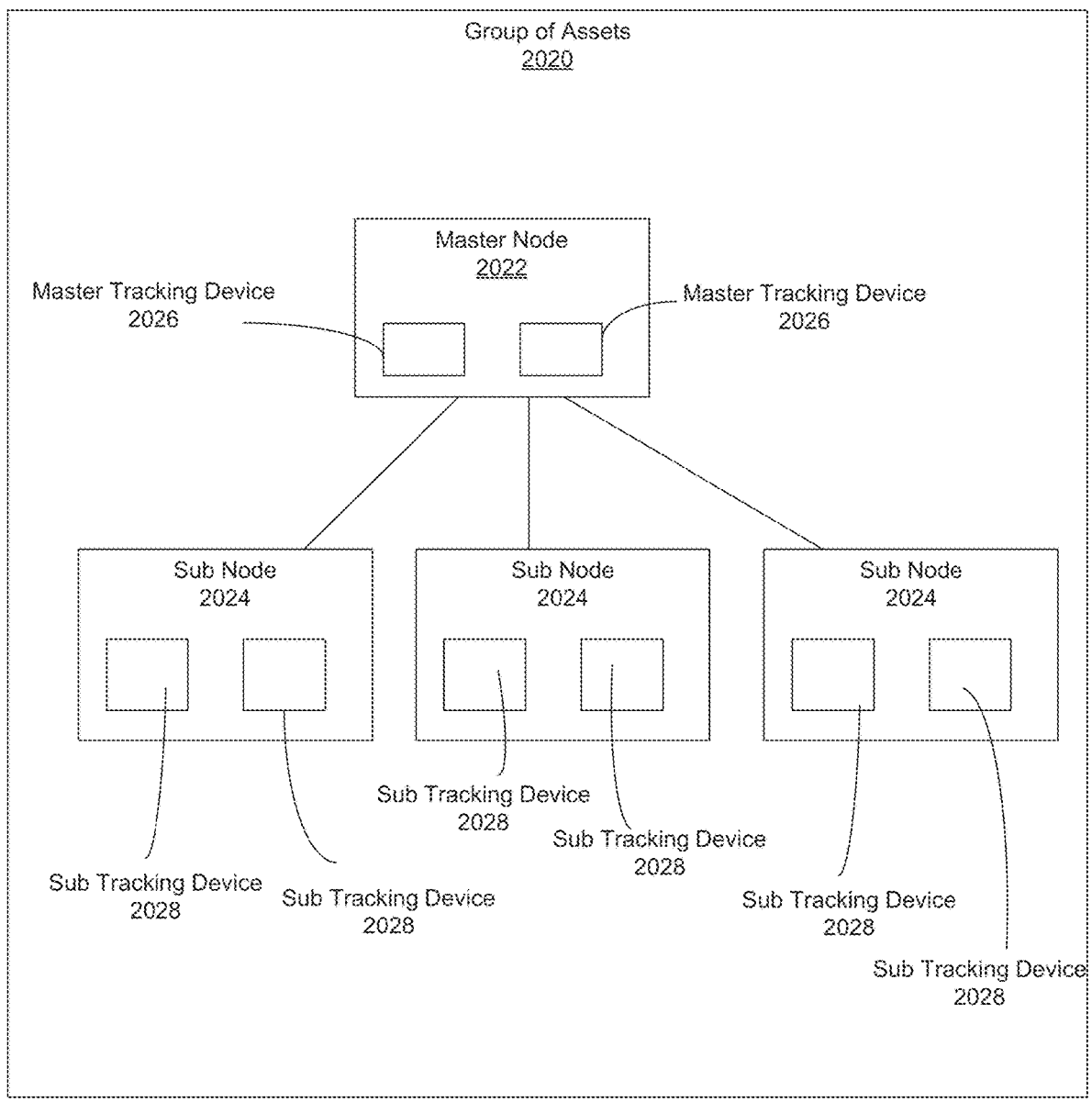
Figure 20C:
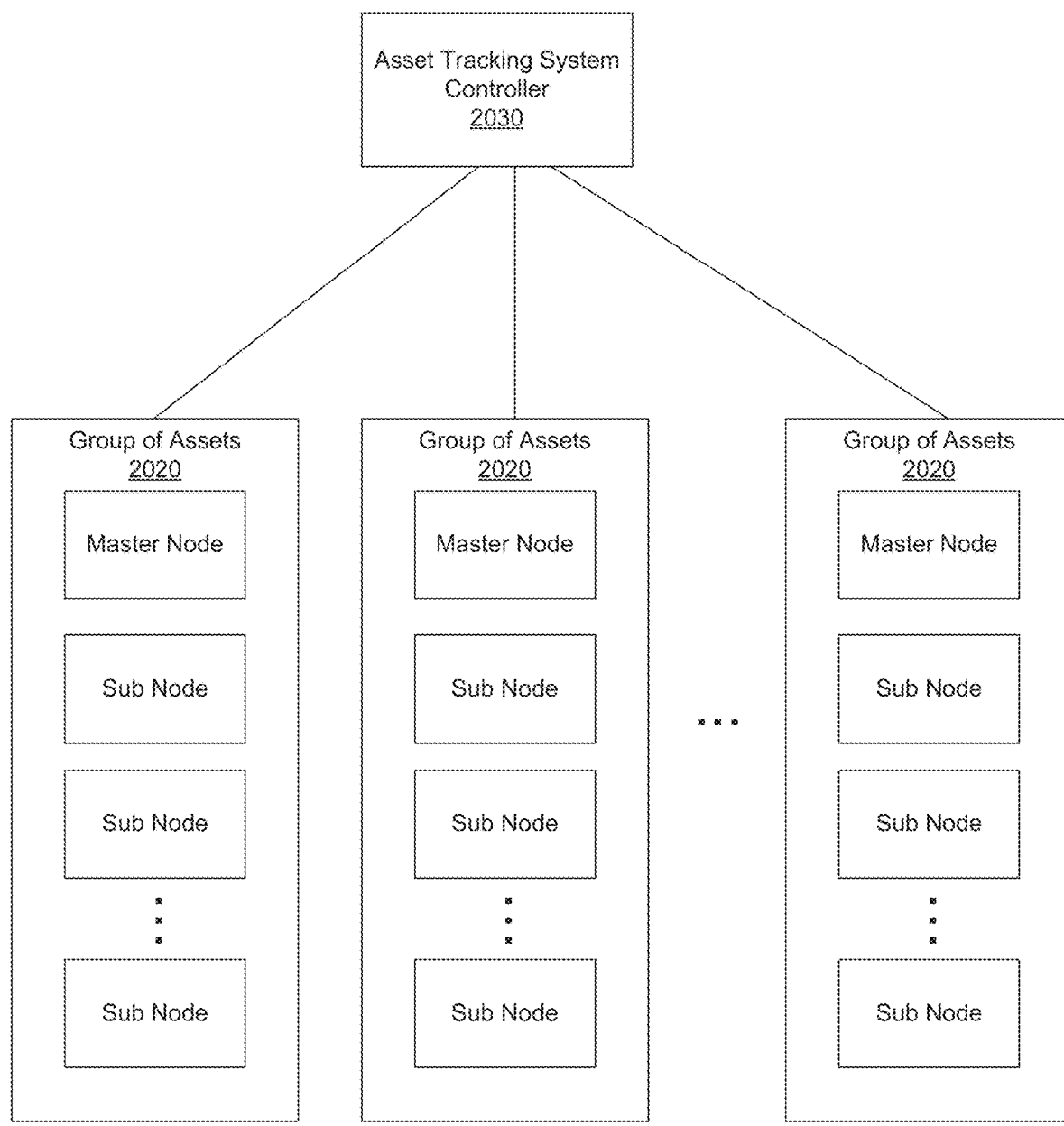

FIGS. 20A-20C are block diagrams showing a hierarchy of tracking devices, in accordance with some embodiments. FIG. 20A shows an asset 2010, in accordance with some embodiments. The asset 2010 may be a container asset, such as the container asset 1100. The asset 2010 includes four tracking devices 2012 that are attached to the asset 2010. In other embodiments, the asset 2010 includes a different number of tracking devices 2012. Each tracking device 2012 stores an asset identifier associated with the asset 2010. Each tracking device 2012 is an embodiments of the tracking device 1310, according to some embodiments.

FIG. 20B shows a group of assets 2020 that are grouped in proximity to each other in an arrangement, according to some embodiments. For example, assets 2010 in the group of assets 2020 may be vertically stacked on top of each other. While FIG. 20B shows a group of assets 2020 with one master node and 3 sub nodes, a group of assets 2020 may have a different number of nodes. Each asset 2010 is assigned a role of master node 2022 or sub node 2024. The role of master node is assigned to a node based on its physical position within the group relative to the other nodes, the battery charge level of each node, the communication capabilities of each node, a type of wireless gateway device associated with the group of assets 2020, some other factor, or some combination thereof. The tracking devices attached to the assets with the master node role 2022 assume the role of master tracking devices 2026. The tracking devices attached to assets with the sub node role 2024 assume the role of sub tracking devices 2028. The sub tracking devices 2028 operate in accordance with instructions and communication from the master tracking devices 2026, according to some embodiments. The sub tracking devices 2028 communicate their asset identifiers and other data (e.g., location data, battery life, etc.) to other sub tracking devices 2028 and to the master tracking devices 2026. The master tracking devices 2026 coordinate the operation and communications of the sub tracking devices 2028 and also relay communications to other members of the asset tracking system 400. The master and sub node roles may be dynamically assigned and updated throughout the use of the tracking devices.

FIG. 20C shows a plurality of groups of assets 2020 in an environment, according to some embodiments. The master tracking devices of each group of assets 2020 may communicate with each other and with the other members of the asset tracking system 400 including an asset tracking system controller 2030. The asset tracking system controller 2030 may be included on the servers or cloud of the asset tracking system 400, according to some embodiments. The asset tracking system controller 2030 may communicate with each of the group of assets 2020 indirectly via a gateway device or another wireless node that bridges communications between the asset tracking system controller 2030 and the groups of assets 2020. Each group of assets may communicate with the gateway device or other wireless node through a tracking device associated with a master node, with the master node tracking device acting as a proxy for a respective group of assets 2020.

FIG. 21 is a flow chart for a method of detecting assets that are grouped together in a special arrangement, in accordance with some embodiments. The method includes detecting 2110 two or more assets as being grouped (e.g., stacked) based on data from one or more tracking devices associated with at least one of the assets. An order of the grouped assets is determined 2120, the order representing relative positions of the assets in the group. A battery life for each tracking device associated with each of the grouped assets is determined 2130. One of the assets is identified 2140 as a master node based on the order of the assets and the battery life of each of the one or more tracking devices. A manifest of the grouped assets is determined 2150, the manifest including an identifier for each asset and a current number of assets in the group. The master node communicates 2160 the manifest for the group of assets to the asset tracking system via another wireless communications with a wireless node of the asset tracking system. The number of grouped assets is stored 2170 in a database of the asset tracking system and the information from the database is optionally displayed on a user's client device.

Computer Apparatus

Figure 22:
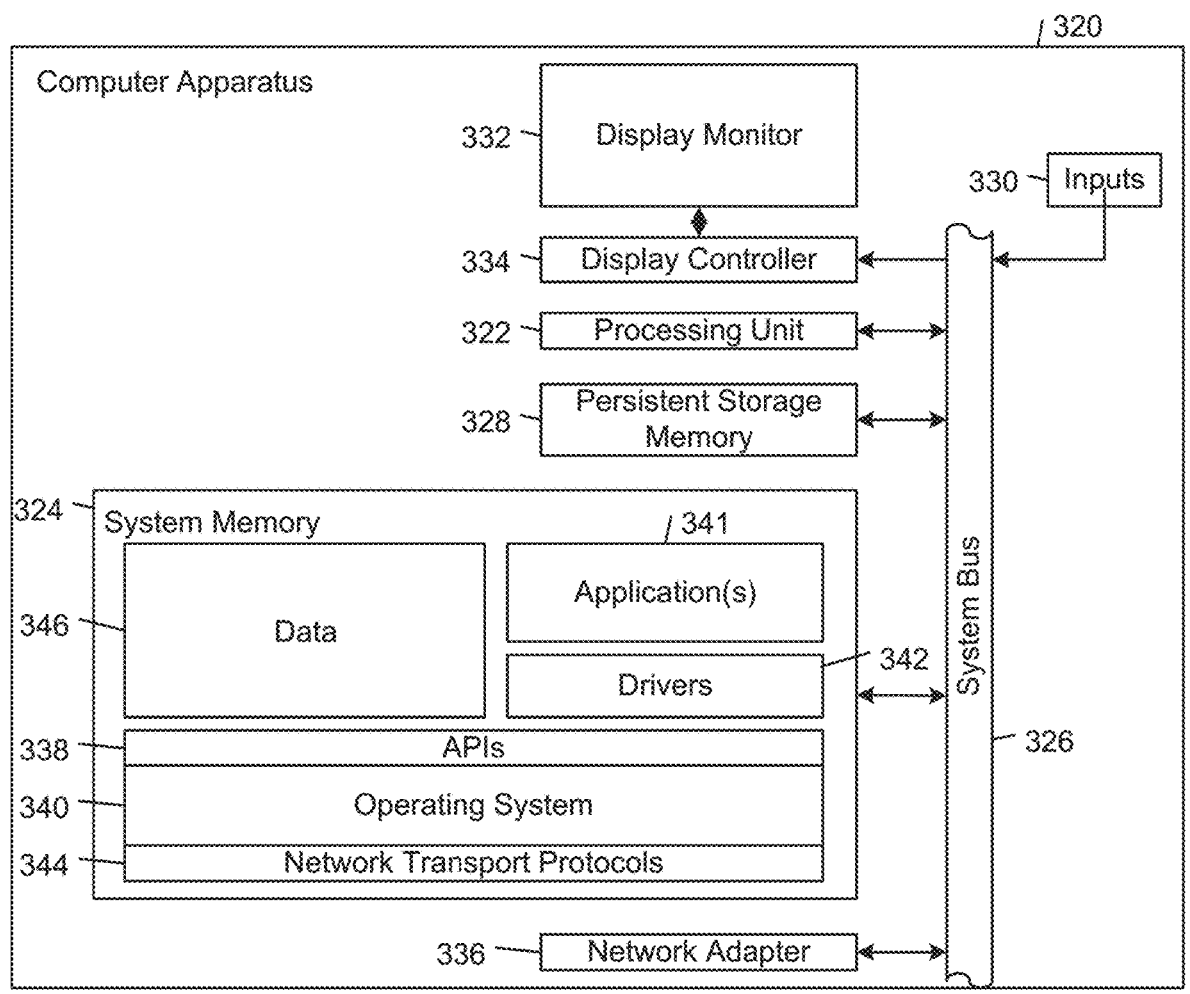
FIG. 22 shows an example embodiment of computer apparatus, according to some embodiments.

FIG. 22 shows an example embodiment of computer apparatus 320 that, either alone or in combination with one or more other computing apparatus, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Washington U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

Additional Embodiments

Because of lead time (manufacturing time, travel time, etc.), it is desirable to be able to detect quickly and accurately when items are sold in-stores, consumed, emptied so as to ensure that manufacturers can provide a steady supply while not over-estimating a desired amount of items. While this may currently be done by having users manually count or tally up assets, this often leads to incorrect assessments of current inventory, due to, for example, double counting of assets (which may result in the "bullwhip effect"). Method and system for accurately tracking inventory and use of assets is desired.

Disclosed are an apparatus, system, and method thereof which retrofits container assets or other assets with tracking devices capable of detecting when an associated product or item is sold or removed from the container asset or other asset. In some embodiments, tracking devices include weight sensors that detect the weight of objects stored on the container asset. When assets are empty, they are typically grouped in standard ways. For example, pallets are stacked, while other assets (kegs, tanks, etc.) may be gathered into a designated area when they are empty or after being used, in contrast to being dispersed when in use. The tracking system can leverage this by detecting when assets are grouped in these ways and identifying that those assets are empty or have been used based on an expected grouping of assets after the asset has been used, depleted, and/or emptied.

Using the tracking device to retrofit the asset, we can also identify: when stacked or grouped assets are at risk of tipping over and can remotely alert users when this occurs. The tracking devices may be used to determine a height of the stack based on sensors onboard the tracking device or based on wireless communications between tracking devices on the assets. For example, the tracking devices may communicate with each other to identify how many assets are stacked on top of each other and a height of the stack may be determined based on the identified number of assets in the stack. If the height of the stack exceeds a threshold number that corresponds to a safe or stable height of the stack, the tracking system may notify a user or administrator of the risk posed by the stack.

When assets are tampered with, e.g., if removal of inventory or separation of assets in a group occurs at an unexpected time (e.g., according to rules or schedule for the assets), or if grouped assets are moved in unusual ways, this may be due to tampering, theft, or vandalism. The tracking system may detect this by detecting separation of the assets in a group based on wireless communications or sensors in the tracking devices on each asset. The tracking system may remotely alert users when this occurs.

The tracking system may also alert manufacturers, retailers, distributors, and/or sellers when they should prepare or send more inventory to another point in the supply chain. The tracking system may be configured to remotely alert users when stock is running low, based on detected usage of the assets.

Techniques for sensing asset groupings may include. include: techniques based on wireless communication (Bluetooth or other short-range communications between tracking devices, LoRa communications between tracking devices and/or gateway devices), techniques based on detecting physical contact or connection between adjacent and/or stacked assets. Other techniques may include a wire network, wherein tracking devices include circuitry and/or physical contacts that complete a closed circuit when the assets are stacked or grouped in a particular way. For example, the tracking devices line up in a specific orientation when assets are stacked such that electrical contacts and/or leads make a mechanical/electrical connection when the assets are stacked. In some embodiments, magnetic sensors and magnets are used. Tracking devices may include magnetic sensors and/or magnets for detecting proximity to another tracking device on an nearby asset, based on detecting a magnetic field that corresponds to the tracking devices being in proximity to one another. In another embodiment: Tracking device on a container asset includes a weight sensor for measuring weight of cargo assets stored on the container asset. For example, a tracking device on a pallet may measure the weight of items stored on the pallet or may measure the weight of other pallets stacked on top of the pallet.

The tracking device or the tracking system may communicate the above data and events to the user via alerts or notifications. User can determine whether inventory needs to be replenished based on received alerts.

In some embodiments, a tracking device is attached at the bottom of pallet. In some embodiments, the tracking device is placed in or on one or more stringers or support poles of the pallet or another asset.

Alternate methods may be used to indirectly measure weight of objects stored on container asset. If the container asset is a pallet, a tracking device may be used to measure displacement in one or more deck boards of a pallet caused by weight of objects. A weight of the object may be determined based on the measured displacement. In other embodiments, a tracking device measures lengthening or compression of stringers or deck boards, which corresponds to stress or strain placed on the pallet caused by weight being loaded onto the pallet. The measured lengthening or compression may be used by the tracking system to calculate weight on top of the pallet In some embodiments, a tracking device measures bending of deck boards in a pallet. The tracking device may include an elastic material placed between conductive layers (e.g., copper strips) placed on two opposing deck boards, and the tracking device measures the capacitance between the copper layers to determine a relative displacement of the deck boards from each other. An amount of weight causing the displacement and/or change in capacitance from the default, unloaded state may be calculated based on the measured capacitance change.

In some embodiments, a tracking device may use an off-the-shelf weight sensor to determine the loaded weight, including, but not limited to, a pressure sensor, a load cell, a force sensor, a capacitance-based weight sensor, a resistance based weight sensor, a strain sensor, or some other type of weight sensor.

The tracking system is configured to detecting when a container asset is stacked on top of another container asset. When a pallet or other container asset is empty, it is often stacked with other empty pallets. Therefore, if tracking system detects multiple assets are stacked on top of each other, the tracking system may determine that the asset is empty or not being used.

A tape node is placed on top and on bottom of each pallet. The tape nodes detect if there are other pallets on top or below the current pallet. If the tape node detects that its associated pallet is stacked with other pallets, then it determines that the associated pallet is empty The tracking system is versatile against hostile environments. Tape nodes may be inside the pallet, for example, in between stringers or in between deck boards, to protect the tape node. The structure of the pallet or asset may act as a barrier against hostile conditions for the tape node.

In some embodiments, the tracking device on an asset measures distance from other tracking devices on other assets. The tracking device is configured to measure when another tape node is within X distance (e.g., 1 ft) by detecting through Bluetooth or another close proximity signal. By detecting that another asset is within a threshold distance, the tracking system may determine, based on this detection, that the other asset is stacked together with the asset.

In some embodiments, pallets have to be stacked in a set configuration or a series of set configurations (e.g., we may be able to rotate pallets 90 degrees, 180 degrees, etc.) The pallets may have a structural design that only allows for pallets to stack in certain configurations (e.g., fit into each other a certain way based on where runners vs. gaps are). To ensure that the tracking devices correctly capture possible rotations of pallets, tape nodes may be placed into multiple corners of pallets or into a center of the pallet rather than, e.g., only on one side or only in one corner of the pallet, so as to ensure that at any given rotation, there is at least one set of tape nodes that align. The tracking devices may be used to determine an orientation of the pallet, respective to a ground plane or axis, for example.

The tracking system may detect different rotation configurations of the pallets using various methods.

A tracking device on an asset may detect the presence of another asset using various methods. The methods may include detecting magnetic fields associated with another asset. One type of tape node may be configured to senses if there's a nearby magnetic field present. This is referred to as an "active" tape node. Other tape nodes have permanent magnets and are referred to as "passive" tape nodes or assets, retrofitted so that it is detectable but not necessarily able to perform any detecting itself.

In another method, physical contact between assets is detected. Conductive contacts or leads are exposed on the tracking devices. The conductive contacts or leads make a physical and electrical connection with conductive contacts or leads of other tracking devices when the assets are lined up and grouped in an appropriate orientation. By detecting the physical contact, the tracking system may detect when the pallets are stacked the right way, forming a "network" between stacked pallets or other assets In some embodiments, the tracking system is able to extend battery life of tracking devices by automatically and selectively initiating a hibernation mode or a lower power usage mode in tracking devices. If the tracking system detects that a group of tape nodes are grouped together at the same location, then the tracking system may infer that the container assets associated with the tape nodes are likely no longer transporting or holding products or cargo. Thus, the tape nodes in the group don't require high-granularity updates, and they can rely on updates from a single tape node in the group rather than having each and every member of the group perform redundant functions, such as reporting location of the assets.

One tape node may assume the role of communicator or master. The other tape nodes in the group can hibernate or reduce the number or intensity of functions being performed. Roles for the tape nodes in the group can swap on the fly based on battery life, rearranging of the stack, removal or addition of assets to the stack, etc. The tape nodes in a group are able to communicate amongst each other and make decisions using distributed intelligent software, to assign roles among the group of tape nodes. The distributed intelligent software is discussed in further detail in U.S. Nonprovisional patent application Ser. No. 17/448,346, filed Sep. 21, 2021, titled "Distributed Intelligent Software for Industrial IOT," which is incorporated herein by reference in its entirety.

A tracking device on a container asset may determine whether a nearby tracking device is adjacent to the tracking device in a horizontal or a vertical direction. In some embodiments, a tracking device on a container asset may use beam steering to detect other tracking devices that are proximal to the container asset in a specific direction. For example, the tracking device may be able to detect other tracking devices that overlap the asset in a vertical direction. Similarly, the tracking device may also detect other tracking devices that overlap the asset in a horizontal direction. The tracking device may use beam steering to communicate with tracking devices that are in the path of a wireless communication beam that is pointed in a specific direction.

In other embodiments, the tracking device uses the physical constraints of the container asset to determine if an asset is placed horizontally adjacent or vertically adjacent to an associated asset. For example, a tracking device may be attached on a center stringer of a pallet. Horizontally adjacent palettes will be further away than vertically adjacent pallets, due to the relatively flat shape of the pallet.

In the tracking system, a higher margin of error may exist for detecting stacked assets. For example, the tracking devices may detect whether multiple pallets are stacked up high; however, an issue may exist of potentially mixing up horizontally proximal pallets with stacked vertically adjacent pallets once the number of pallets in the stack exceeds a threshold number, since the height of the stack may exceed the width of an individual pallet. In further embodiments, the tracking system may recommend users limit the height of stacks of pallets, to prevent running into this issue.

The tracking devices on each container asset in a stack of container assets can communicate up (or down) a stack, so that a topmost (or bottommost) pallet sums the total number of assets in the stack based on the communication relay between the tracking devices, rather than a single asset having to detect all assets in the stack. In this case, each tracking device may be configured to only communicate with tracking devices on adjacent container assets. Doing so, the tracking device may detect if there is a container asset directly on top of or directly below the current tracking device. If all pallets are retrofitted with the same capabilities (e.g., all are "active" and have both magnetic sensors and magnets), then each tracking device only need to detect the tracking device above OR below the current pallet and relay a tally or iterative manifest to the next tracking device in the stack to count or catalog all of the tracking devices in the stack. The last tracking device in the stack will receive the full catalog or tally of tracking devices or assets in the stack.

If some pallets are active while others are passive (e.g., some pallets have only magnets but no sensors to detect magnetic fields), pallets may be miscounted depending on how they are stacked or interact with each other. For example, two pallets having only magnets stacked on top of each other may not be able to detect each other. In order to prevent miscounting, users may be instructed to stack assets in a certain order. The container assets or the tracking devices may include markings to differentiate between active and passive tracking devices/tape nodes. Thus, the user may be instructed to stack the assets in a way that active and passive tracking devices alternate in the stack.

In some embodiments, tracking devices in the stack of palettes form a group that have organized communication and computation in order to determine how many pallets are in the stack, determine identifiers for all pallets in the stack, and perform other functions as a group. One of the tracking devices of the group is assigned master node role that is "in charge" of the stack, and the other tracking devices in the group are assigned a sub node role. May be determined based on topmost pallet (beneficial for GPS communication), highest battery level, or some combination of multiple factors (e.g., highest battery level within X assets from the top).

The master node is capable of locating a specified pallet in the stack, e.g., if a request for a particular pallet to be located is put into the wireless tracking system, if the master node receives a corresponding request from other wireless nodes of the tracking system 400. The master node may generate and store a hash table or other database to store IDs of sub nodes in the group. The master node may respond in lieu of the requested tracking device with location data that corresponds to a location of the group. Roles for the tracking devices in the group is recalibrated responsive to any changes in the stack (e.g., if something is added or removed).

In some embodiments, the master node may be equipped with one or more sensors. The master node may can determine changes to the stack based on sensor data measured by the master node (e.g., GPS coordinates, acceleration, etc.). The master node may poll sub nodes every hour, every 10 minutes, etc. to see whether anything has changed in the stack or to receive any relevant sensor data, such as acceleration data, location data, RSSI data etc.

The master node may schedule a wake-up call for sub nodes to ping the master node, and the sub nodes may store the schedule on their respective memories or storage. The sub nodes may then report in at the scheduled times. Responsive to receipt of communication between a sub node and a master node, the tracking devices may recalibrate clocks of the tracking devices or recalibrate based on clocks of other wireless nodes in the tracking system to ensure that scheduled communications take place correctly and without requiring the master node to deplete its battery levels.

In some embodiments, the tracking system communicates with multiple stacks to determine the location, number of assets in each stack, total number of stacks in an environment, total number of stacked assets in an environment, perform cloud level control of the grouped tracking devices, issue instructions to users to perform on stacks or groups, and other functions.

In some embodiments, empty, used, or depleted container assets are stored in corresponding locations. For example, a corresponding location may be a storage or disposal area in a building or facility. The tracking system stores a geofence corresponding to the location. Gateway devices may be associated with the location and may scan for tracking devices at the location. The tracking system may detect that a container asset is in the location based on wireless communication between the associated gateway devices and a tracking device on the container asset. The tracking system may thus determine that any container asset at that location is empty and detect usage or depletion of assets, respectively. In other embodiments, the location of an asset may be determined based on GPS data from a GPS communication system integrated into the tracking device on the asset.

In some embodiments, the container assets are Beer kegs, propane tanks, boxes, or other types of assets.

Tracking devices can be attached to any reusable/resupply-able asset for inventory and circulation tracking and management The tracking system may detect any grouping of assets, in addition to detecting stacking of assets. For example, the tracking system may detect when an asset is hooked up or removed from a rack, a plug, a gas line, etc, based on data collected by a tracking device on the asset. The rack, gas line, plug, outlet, or other infrastructure may also include a tracking device or gateway device, according to some embodiments. Tracking device on asset communicates with the tracking device on the infrastructure Tracking device on asset detects proximity to the tracking device on the infrastructure. System determines that the asset is used/empty when the asset is removed from the location of the infrastructure This applies in cases where being removed from the infrastructure correspond to the asset being empty/used. For example, when a propane tank is empty it is removed from a grill or other equipment it is supplying propane to, the tracking system may determine that the propane tank is empty.

By detecting that a grouped stack of pallets (which have tracking devices on them to detect the stacking) has had a change in the stack, can alert user that a falling over event has occurred. This may be in response to an unexpected or significant change in the manifest (list of tracking devices/assets in the stack) tracked by tracking devices of the stack.

Theft or tampering of pallets may be detected based on a tracked manifest of pallets in a stack changing at an unexpected time.

If a container asset is a rack with tires, a tape node may be attached to the bottom of the rack. The tape node may be configured to measure distance of the bottom of rack or trailer to the floor (how much the trailer is sagging), using one or more sensors. For example, the tape node may include a light sensor, time of flight sensor, an acoustic sensor reflection sensor, a radar sensor, an interferometer, or some other distance sensor. When the container asset is loaded with weight the tires of the rack may sag and the bottom of the rack may be displaced to be closer towards the floor than when there is no weight loaded. Thus, the tape node may determine a loaded weight based on a measured height of the bottom of the rack off of the floor.

The tracking system may send alerts to users, including alerts to Notify the current weight, to Notify the change in weight, to Notify a user at receiving end or ownership end of a supply chain, or to provide other notifications. A receiving user no longer has to go and count the number of boxes, with use of the disclosed method and system thereof.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   storing an identifier associated with an asset on a memory of a tracking device attached to the asset, the tracking device configured to wirelessly communicate with other nodes of an asset tracking system including other tracking devices attached to other assets;
   detecting, by the tracking device, that the asset that the tracking device is attached to has been grouped with other assets with respective other tracking devices;
   determining a manifest of asset identifiers for each asset in the group of assets;
   transmitting the manifest to the asset tracking system by at least one tracking device attached to an asset in the group of assets; and
   determining, by the asset tracking system, that each asset corresponding to the identifiers in the manifest is used or empty.

2. The method of claim 1, further comprising notifying a user of the asset tracking system via a client device associated with the user that each asset corresponding to the identifiers in the manifest is used or empty.

3. The method of claim 1, further comprising:
   calculating a number of used or empty assets in the group of assets; and
   notifying a user of the asset tracking system via a client device associated with the user of the number of used or empty assets.

4. The method of claim 1, further comprising:
   receiving location data from at least one tracking device associated with an asset of the group of assets;
   determining a location of the group of assets based on the received location data; and
   notifying a user via a client device associated with the user of the determined location.

5. The method of claim 1, further comprising determining a total number of used or empty assets in an environment associated with the group of assets based in part on the received manifest from the at least one tracking device.

6. The method of claim 5, further comprising:
   in response to the total number of used or empty assets in the environment being larger than or equal to a threshold number, determining that the environment is in need of resupply of assets; and
   notifying a user via a client device associated with the user that the environment is in need of resupply.

7. The method of claim 6, further comprising, in response to the total number of used or empty assets in the environment being larger than or equal to the threshold number, automatically issuing an instruction to resupply the environment in a supply management system.

8. The method of claim 1, wherein the detecting, by the tracking device, that the asset has been grouped with other assets comprises:
   receiving wireless communications from other tracking devices on other assets of the group of assets,
   based on the received wireless communications, determining a distance between the asset and the other assets of the group of assets,
   based on the distance between the asset and the other assets of the group being below a threshold distance, determining that the assets are grouped together.

9. The method of claim 1, wherein the assets in the group are stacked on top of each other vertically.

10. The method of claim 1, further comprising:
    receiving sensor data from a tracking device associated with one asset of the group of used or empty assets.

11. The method of claim 10, further comprising reporting the received sensor data to a server of the tracking system.

12. The method of claim 10, wherein the determining that each asset corresponding to the identifier in the manifest is used or empty is based at least partially on the received sensor data.

13. The method of claim 12, wherein the determining that each asset corresponding to the identifier in the manifest is used or empty is based on the sensor data corresponding to a sensor reading being below a threshold level.

14. The method of claim 9, further comprising determining how many assets are stacked above the first asset, based on wireless communications between the first asset and the tracking devices associated with other assets in the group of used or empty assets.

15. The method of claim 14, further comprising:
    receiving weight sensor data from a first tracking device associated with a first asset of the group of used or empty assets, wherein
    determining that each asset corresponding to the identifiers in the manifest is used or empty is at least partially based on the weight sensor data indicating that the weight of the assets stacked above the first asset are lower than a threshold value.

16. A system comprising:
a plurality of wireless nodes comprising a plurality of tracking devices, each tracking device attached to a respective asset and comprising:
  a processor,
  a battery,
  a wireless communication system for communicating with other wireless nodes of the system, and
  a memory or storage storing an identifier associated with the respective asset;
a first tracking device of the plurality of wireless nodes, the memory or storage of the first tracking device storing instructions when executed by the tracking device cause the tracking device to:
  detect that a first asset that the tracking device is attached to has been grouped with other assets;
  determine a manifest of asset identifiers for each asset in the group of assets; and
  transmit the manifest to another wireless node of the system; and
a server configured to track the assets associated with the plurality of tracking devices based on received data on the plurality of tracking devices, wherein
the server is configured to receive the determined manifest of asset identifiers for each asset in the group of assets from a wireless node of the system, and determine that each asset corresponding to the identifiers in the manifest is used or empty.

17. The system of claim 16, wherein the first tracking device determines the manifest of asset identifiers based on wireless communication between the first tracking device and tracking devices associated with the group of assets.

18. The system of claim 16, further comprising a client device associated with a user of the system, the client device configured to:
  receive a notification from a wireless node of the system that each asset corresponding to the identifiers in the determined manifest are used or empty; and
  display the received notification to the user on a display of the client device.

19. The system of claim 18, wherein the server detects the usage of a type of asset based on the received data on the plurality of tracking devices, and sends an alert to the client device, in response to determining that an amount of stock of the type of asset is low, based on the detected usage.

20. The system of claim 16, wherein the first tracking device further comprises a sensor, and the first tracking device is configured determine a height of the first asset based on sensor data measured by the sensor.

* * * * *